(12) United States Patent
Noge

(10) Patent No.: US 8,648,871 B2
(45) Date of Patent: *Feb. 11, 2014

(54) STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(75) Inventor: Tetsuya Noge, Kai (JP)

(73) Assignees: Nintendo Co., Ltd., Kyoto (JP); HAL Laboratory Inc., Tokyo (JP)

( * ) Notice: Subject to any disclaimer, the term of this patent is extended or adjusted under 35 U.S.C. 154(b) by 609 days.

This patent is subject to a terminal disclaimer.

(21) Appl. No.: 12/913,961

(22) Filed: Oct. 28, 2010

(65) Prior Publication Data

US 2011/0304640 A1 Dec. 15, 2011

(30) Foreign Application Priority Data

Jun. 11, 2010 (JP) .................................. 2010-134568

(51) Int. Cl.
| | |
|---|---|
| G09G 5/00 | (2006.01) |
| G09G 5/02 | (2006.01) |
| H04N 5/225 | (2006.01) |
| H04N 5/445 | (2011.01) |
| A63F 13/00 | (2006.01) |
| H04N 1/21 | (2006.01) |
| H04N 1/387 | (2006.01) |
| G06K 9/36 | (2006.01) |
| G06K 9/32 | (2006.01) |
| G06F 3/00 | (2006.01) |
| G06F 3/048 | (2013.01) |

(52) U.S. Cl.
USPC ........... 345/582; 345/419; 345/619; 345/630; 345/632; 345/649; 348/174; 348/207.1; 348/552; 348/564; 358/302; 358/450; 382/285; 382/296; 382/305; 463/1; 463/32; 715/700; 715/757; 715/851

(58) Field of Classification Search
USPC ................. 345/418–419, 427, 473–675, 7–9; 348/135–137, 169, 174, 180, 207.1, 348/207.11, 208.99, 208.14, 231.9, 348/552–553, 563–565, 571, 578; 358/448, 358/450, 302; 382/154, 305, 307, 285, 382/293–296, 298; 463/1, 30–32, 43; 715/700, 706, 757, 763–764, 778, 782, 715/848–851, 861

See application file for complete search history.

(56) References Cited

U.S. PATENT DOCUMENTS

| | | | |
|---|---|---|---|
| 7,585,225 | B2 | 9/2009 | Minagawa |
| 2008/0100620 | A1 | 5/2008 | Nagai et al. |
| 2008/0293488 | A1* | 11/2008 | Cheng et al. ..................... 463/31 |
| 2009/0027386 | A1* | 1/2009 | Furuhashi et al. ............ 345/421 |
| 2011/0053688 | A1* | 3/2011 | Crawford et al. ............... 463/31 |
| 2011/0298823 | A1* | 12/2011 | Kitahara ....................... 345/632 |

FOREIGN PATENT DOCUMENTS

| | | |
|---|---|---|
| JP | 11-259672 | 9/1999 |
| JP | 2002-232782 | 8/2002 |
| JP | 2006-72667 | 3/2006 |
| JP | 2007-222310 | 9/2007 |

OTHER PUBLICATIONS

Explanation of Circumstances Concerning Accelerated Examination for JP2010-134568, 3 pages, filed Dec. 3, 2008.

* cited by examiner

*Primary Examiner* — Wesner Sajous
(74) *Attorney, Agent, or Firm* — Nixon & Vanderhye P.C.

(57) ABSTRACT

An information processing section of a game apparatus executes a program for implementing a step S100 of acquiring a camera image; a step S200 of detecting a marker; a step S400 of calculating a position and an orientation of a virtual camera; a step S600 of generating an animation in which layed-flat surfaces of a hexahedron appear, and the hexahedron is folded so as to confine virtual objects representing targets therein when a stage is cleared; a step S800 of generating an animation in which the folded hexahedron is unfolded so as to position different virtual objects thereon; a step S900 of mapping the photographed image on objects; a step S1000 of taking an image of the objects by means of the virtual camera; and a step S1100, S1200 of displaying the camera image and an object image which is superimposed on the camera image.

21 Claims, 18 Drawing Sheets

(THIRD POSITION)

(FIRST POSITION)

F I G. 9

| STAGE NUMBER | VIRTUAL OBJECT NUMBER | VIRTUAL OBJECT NAME | POSITION DATA REPRESENTING PLANE POSITIONS (MARKER COORDINATE SYSTEM) | ROTATION AXIS DATA |
|---|---|---|---|---|
| 1 | 1 | BUILDING | | |
| | 2 | TREE | | |
| | 3 | TARGET A | | |
| | 4 | TARGET B | | |
| | 5 | TARGET C | | |
| 2 | 1 | BUILDING | | |
| | 2 | CONE | | |
| | 3 | SMALLER TARGET A | | |
| | 4 | SMALLER TARGET B | | |
| | 5 | SMALLER TARGET C | | |
| | 6 | SMALLER TARGET D | | |
| | 7 | SMALLER TARGET E | | |
| | 8 | SMALLER TARGET F | | |
| ⋮ | ⋮ | | ⋮ | ⋮ |

F I G. 1 3
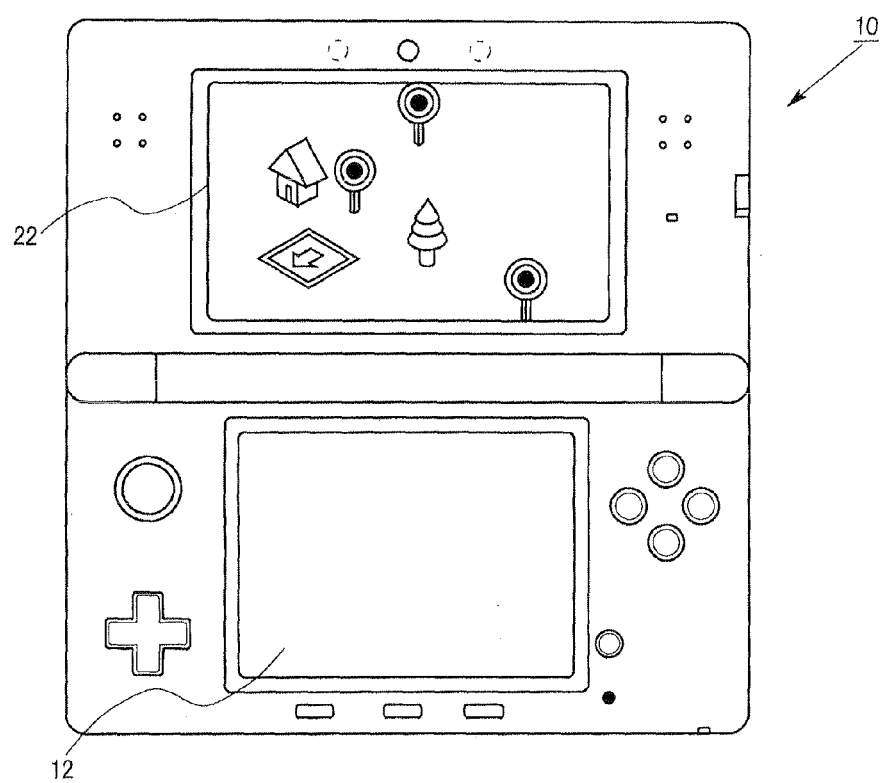

STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-134568, filed on Jun. 11, 2010, is incorporated herein by reference.

BACKGROUND

1. Field

Exemplary embodiments of the present invention relates to an information processing technique for realizing a natural augmented reality effect by displaying, in a real space which is visible to a user, an image in which a virtual object image is superimposed on a photographed image, and more particularly to an information processing technique for causing a virtual object to appear or changing the virtual object so as to allow a user who is experiencing a natural augmented reality to maintain his/her interest enhanced.

2. Description of the Background Art

There are many games which are realized by programs being executed by dedicated game apparatuses or general-purpose computers. In many of such games, stages having different difficulty levels are provided so as to enable a user to continuously have an interest in the game, and the user is sequentially guided from a stage having a lower difficulty level to a stage having a higher difficulty level. In such a game, when a user clears a certain stage, and advances to a subsequent stage, a predetermined image is displayed on a game screen as shown in, for example, FIG. 9 of Japanese Laid-Open Patent Publication No. 2007-222310 (hereinafter, referred to as Patent Document 1). According to Patent Document 1, the predetermined image is displayed on the screen in order to perform a process for reading data necessary for the subsequent stage.

However, if a game screen presenting a realistic scene shifts to the predetermined image (single color image representing "Now loading . . . " in Patent Document 1) as in the game apparatus disclosed in Patent Document 1, a user is prevented from being involved in a game, and a user may become less interested in the game. Therefore, it is important to display a game screen which does not prevent a user from being involved in the game even when a stage shifts to another one.

On the other hand, a so-called augmented reality system is realized which displays, as if an object exists in a virtual space, an image in which a virtual object image is superimposed on a real world (a real space or a real environment) that is visible on a screen of a display device. The augmented reality system provides a technique for displaying a virtual object in a real world, and displays the virtual object, without causing unnaturalness, by, for example, superimposing a previously generated image of the virtual object on a real space photographed by a camera. When such an augmented reality system is applied to a hand-held game apparatus, a game can be realized in which, for example, a target used for a shooting game is positioned as a virtual object in a real world the image of which is taken by an imaging unit of a game apparatus, and a user shoots at the target which is the virtual object.

Also in some of such shooting games realizing the natural augmented reality effect, a stage having a lower difficulty level shifts to a subsequent stage having a higher difficulty level when the stage having the lower difficulty level is cleared, as described above. In this case, if the game screen shifts to a predetermined screen for switching the stages, although a virtual object can be switched (to a target of a higher difficulty level), a user is prevented from being involved in the game, as described above for a typical game. Therefore, the inventors of the present invention have found that there is a great problem associated with a display method for switching stages in games to which the augmented reality system is applied.

Specifically, in a game to which such an augmented reality system is applied, a field of a stage is a real world which is visible to a user on a screen of a display device. Virtual objects such as characters and targets are superimposed and displayed on such a real world. If a virtual object representing a target for a certain stage is directly switched to a virtual object representing a target for the subsequent stage, the virtual objects are suddenly switched in a state where the real world remains unchanged. In this case, however, it is difficult to realize a natural augmented reality, and a user may feel greatly unnatural.

Further, in a typical game, a character operated by a user may be guided from a field (for example, a forest) of a certain stage to a field (for example, a town) of a subsequent stage. However, in a game to which the augmented reality system is applied, since the field depends on a real world, such a guidance cannot be realized.

In order to overcome the problems, in a game to which the augmented reality system is applied, it is important not only to enable a user to be continuously involved in the game but also to start a new stage by switching virtual characters so as to realize a natural augmented reality. However, neither the game apparatus disclosed in Patent Document 1 nor known techniques can solve these problems.

SUMMARY

Therefore, exemplary embodiments of the present invention may provide a technique that allows, when a virtual object displayed so as to be superimposed on a real world is caused to appear or is changed as necessary, a user to become interested in an image which is displayed when the virtual object is caused to appear or is changed, by applying an augmented reality system, without spoiling the realized natural augmented reality effect.

Exemplary embodiments of the present invention have the following features to attain the object mentioned above.

A computer-readable storage medium according to a first aspect of exemplary embodiment of the present invention has an information processing program stored therein. A computer is included in an information processing apparatus which is connected to an imaging device, a display device for displaying a real space so as to be visible on a screen, and a storage device for storing object data representing a first virtual object in which a closed space is formed, and object data representing a second virtual object positioned in the closed space, and the information processing program stored in the computer-readable storage medium causes the computer of the information processing apparatus to function as: photographed image data acquisition means; first object control means; second object control means; texture mapping means; object image generation means; and display control means. The photographed image data acquisition means sequentially acquires photographed image data representing a photographed image taken by the imaging device. The first object control means changes a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape. The second object control means positions at least one second virtual object on the inner surfaces of the first virtual object, and changes a position and an orientation of the second virtual object in cooperation with the inner surfaces of the first virtual object in accordance with the first virtual object changing from the closed shape to the opened shape. The texture mapping means maps, as a texture, an image of a region corresponding to the first virtual object of the opened shape, on the inner surfaces of the first virtual object, and the image of the region corresponding to the first virtual object of the opened shape being a corresponding part of the photographed image represented by the photographed image data which is sequentially acquired by the photographed image data acquisition means. The object image generation means generates an object image based on each of the second virtual object, and the first virtual object on which the texture is mapped. The display control means sequentially displays, by means of the display device, a superimposed image in which the object image generated by the object image generation means is superimposed on the real space on the screen.

In these configurations, a superimposed image in which the object image representing the first virtual object and the second virtual object is superimposed on a real space on the screen is displayed by means of the display device. In this case, the first virtual object has the inner surfaces and the outer surfaces, and the first object control means changes a shape of the first virtual object, from the closed shape having the closed space formed by the inner surfaces facing inward, to an opened shape formed when the closed space is opened so as to enable the inner surfaces to be captured by the virtual camera, or changes the shape of the first virtual object from the opened shape to the closed shape. At least one second virtual object is positioned on the inner surfaces of the first virtual object, and the second object control means changes a position and an orientation of the second virtual object in cooperation with the inner surfaces of the first virtual object in accordance with the first virtual object being changed (from the closed shape to the opened shape). For example, in a shooting game to which an augmented reality is applied, when targets of a certain stage are changed to the second virtual object corresponding to the targets of the subsequent stage, the positions and orientations of the targets are changed in cooperation with the inner surfaces of the first virtual object (for example, the targets are wrapped by the ground on which the targets are set). The positions and the orientations of the targets positioned on the inner surfaces of the first virtual object of the opened shape are changed in accordance with the first virtual object changing from the opened shape to the closed shape (for example, the opened shape is changed to the closed shape such that the ground is cut by the layed-flat surfaces which are obtained by the hexahedron being unfolded, and the hexahedron is folded to form the closed shape of the hexahedron) to confine the targets in the closed space. Further, the positions and orientations of the targets which are the second virtual object are changed in accordance with the first virtual object changing from the closed shape to the opened shape (for example, the closed shape is changed to the opened shape in accordance with the hexahedron being unfolded), to position targets of the subsequent stage. An image of a region which corresponds to the first virtual object of the opened shape and is included in the photographed image is mapped as a texture on the inner surfaces of the first virtual object in which the targets are positioned. Therefore, a natural augmented reality effect is realized, and the first virtual object changes its shape from the opened shape to the closed shape, and targets of a certain stage are confined in the closed space, and the closed shape is changed to the opened shape to position the second virtual object representing targets of the subsequent stage. In this case, a user becomes interested in the change (from the opened shape to the closed shape) of the shape of the first virtual object and the change (the second virtual object become visible as the first virtual object approaches the opened shape) of the position and orientation of the second virtual object. As a result, when the virtual object which is displayed so as to be superimposed on a real world by applying the augmented reality system is caused to appear or is changed, the realized natural augmented reality effect is not spoiled, and a user can become interested in an image displayed when the virtual object is caused to appear, or is changed.

The first object control means may change the shape of the first virtual object in a form of an animation in which the closed state and the opened state of the first virtual object are sequentially switched therebetween. In this case, the second object control means may change the position and the orientation of the second virtual object in accordance with progress of the animation.

In these configurations, an animation sequentially representing change of the first virtual object from the closed shape to the opened shape, and an animation sequentially representing a state in which the position and orientation of the second virtual object are changed in accordance with the animation of the first virtual object, are used, to confine the second virtual object in the first virtual object. As a result, the change of the shape of the first virtual object and the change of the position and orientation of the second virtual object are sequentially performed. Therefore, the realized natural augmented reality effect is not spoiled, and a user can become interested in an image displayed at the change.

The first object control means may change the shape of the first virtual object from the opened shape to the closed shape, and may change the shape of the first virtual object from the closed shape to the opened shape after the second virtual object is positioned by the second object control means.

In these configurations, the closed space formed when the first virtual object changes from the opened shape to the closed shape is opened to allow the second virtual object to appear.

The second object control means may position at least one third virtual object on the inner surfaces of the first virtual object when the first virtual object has the opened shape, and may change a position and an orientation of the at least one third virtual object in cooperation with the inner surfaces of the first virtual object in accordance with the first virtual object changing from the opened shape to the closed shape.

In these configurations, the first virtual object changes from the closed shape to the opened shape, and, for example, the third virtual object representing the targets of the first stage is confined in the closed space, and the first virtual object changes from the closed shape to the opened shape, so that the second virtual object representing the targets of the second stage can appear. As a result, when the virtual objects which are displayed so as to be superimposed on the real world by applying the augmented reality system are switched, the realized natural augmented reality effect is not spoiled, and a user can become interested in an image displayed at the switching.

The second object control means may position the second virtual object, instead of the at least one third virtual object, on the inner surfaces of the first virtual object after the first virtual object is changed from the opened shape to the closed shape.

In these configurations, the first virtual object changes from the closed shape to the opened shape, and, for example, the third virtual object representing the targets of the first stage can be switched to the second virtual object representing the targets of the second stage.

Preferably, the display control means may make a display so as to prevent the second virtual object from being transmitted through surfaces forming the closed space.

In these configurations, as the first virtual object changes from the opened shape to the closed shape, the third virtual object disappears, or as the first virtual object changes from the closed shape to the opened shape, the second virtual object appear. Therefore, a user can become interested in the change. Further, in a case where objects to be positioned on the inner surfaces of the first virtual object are switched when the first virtual object is in the closed shape, the state of the switching is invisible to a user. Therefore, the realized natural augmented reality effect is not spoiled, and a user can become interested in a displayed image.

Preferably, the first virtual object may be a polyhedron formed of a plurality of surfaces which can be layed flat. In this case, the animation may include a shift from a first state to a second state, and the first state represents a state in which the polyhedron is unfolded and the plurality of surfaces of the polyhedron are positioned so as to be layed flat, and the second state represents a state in which the plurality of surfaces of the polyhedron are rotated, and form the closed space of the polyhedron.

In these configurations, an animation is displayed which represents a shift from the first state in which the third virtual object (targets) is positioned on each surface of the polyhedron (for example, a hexahedron) which is the first virtual object, to the second state in which the surfaces of the polyhedron are rotated to form the closed space of the polyhedron. Therefore, a user can become interested in an image displayed when the virtual objects are switched.

Preferably, the animation may include a shift from appearance of the plurality of surfaces, of the polyhedron, which are layed flat, to the first state.

In these configurations, an animation is displayed which represents a shift from a state in which only the third virtual object (targets) is displayed, to a state in which the layed-flat surfaces of the polyhedron which is the first virtual object appear, and the second virtual object is confined in the polyhedron.

Preferably, the animation may include a shift from change of a color of the plurality of surfaces of the polyhedron or change of a color of a border line of the plurality of surfaces of the polyhedron, to appearance of the plurality of surfaces of the polyhedron In these configurations, in a state where only the targets are displayed, a color of the layed-flat surfaces of the polyhedron which is the first virtual object or a color of the sides of the layed-flat surfaces of the polyhedron which is the first virtual object is changed such that the layed-flat surfaces of the polyhedron appear so as to project, thereby realizing a natural augmented reality effect. Further, a user can previously recognize a range of the animation representing the change of the shape of the first virtual object.

Preferably, the first virtual object may be a polyhedron formed of a plurality of surfaces which can be layed flat. In this case, the animation may include a shift from a first state to a third state through a second state, and the first state represents a state in which the polyhedron is unfolded and the plurality of surfaces of the polyhedron are positioned so as to be layed flat, and the second state represents a state in which the plurality of surfaces of the polyhedron are rotated, and form the closed space of the polyhedron, and the third state represents a state in which the plurality of surfaces of the polyhedron are reversely rotated, the polyhedron is unfolded, and the second virtual object is positioned on the plurality of surfaces of the polyhedron which are layed flat.

In these configurations, an animation is displayed which represents a state in which, when only the targets are displayed as the third virtual object, the layed-flat surfaces of the polyhedron which is the first virtual object appear, the third virtual object (larger targets) is confined in the polyhedron, the polyhedron is unfolded, and the second virtual object (smaller targets) appears. Therefore, when the displayed objects are switched, the realized natural augmented reality effect is not spoiled, and a user can become interested in an image displayed at the switching.

Preferably, the animation may include a shift from appearance of the plurality of surfaces, of the polyhedron, which are layed flat, to the first state, or a shift from the third state to disappearance of the plurality of surfaces, of the polyhedron, which are layed flat.

In these configurations, an animation which represents a state in which the second virtual object (different targets) appears when the polyhedron is unfolded can be displayed in addition to an animation which represents a shift from a state in which only the third virtual object (targets) is displayed, to a state in which the layed-flat surfaces of the polyhedron which is the first virtual object appear to confine the second virtual object in the polyhedron.

Preferably, the animation may include a shift from change of a color of the plurality of surfaces of the polyhedron or change of a color of a border line of the plurality of surfaces of the polyhedron, to appearance of the plurality of surfaces, of the polyhedron, which are layed flat, or a shift from the third state, through change of the color of the plurality of surfaces of the polyhedron or change of the color of the border line of the plurality of surfaces of the polyhedron, to disappearance of the plurality of surfaces, of the polyhedron, which are layed flat.

In these configurations, in a state where only the targets are displayed, a color of the layed-flat surfaces of the polyhedron which is the first virtual object, or a color of the sides of the layed-flat surfaces of the polyhedron which is the first virtual object is changed such that the layed-flat surfaces of the polyhedron appear so as to project, and the polyhedron is folded, and the third virtual object disappear. When the polyhedron is unfolded, the second virtual object is positioned on the layed-flat surfaces. In this state, a color of the layed-flat surfaces of the polyhedron or a color of the sides of the layed-flat surfaces of the polyhedron is changed such that the layed-flat surfaces of the polyhedron disappear so as to sink. Therefore, it is possible to realize a natural augmented reality effect.

Preferably, the second object control means may rotate or reversely rotate the second virtual object in cooperation with rotation or reverse rotation, respectively, of the plurality of surfaces of the polyhedron, to change the position and the orientation of the second virtual object.

In these configurations, the first virtual object changes from the opened shape to the closed shape, or changes from the closed shape to the opened shape, by the surfaces of the polyhedron being rotated. The second virtual object rotates in accordance with the rotation of the surfaces of the polyhedron, thereby realizing a natural augmented reality effect.

Preferably, the program may cause the computer to further function as outer surface change means for mapping a predetermined image, as a texture, on the outer surfaces of the polyhedron which are reverse of the plurality of surfaces. In this case, the program may cause the computer to further function as change means for changing display of the photographed image corresponding to a region which is mapped as the texture on the outer surfaces of the polyhedron.

In these configurations, a predetermined image is mapped on the outer surfaces of the polyhedron, and the display of the photographed image corresponding to a mapped region is changed to, for example, the display of the predetermined image. Thus, when the marker is positioned on a lawn in a real space and the shooting game is played on the lawn, an image representing the ground is displayed in a portion on which the lawn is removed, and an image representing the ground is displayed on the layed-flat outer surfaces of the hexahedron, thereby realizing a natural augmented reality effect.

Preferably, the polyhedron may be a hexahedron. The hexahedron may include a cube, a rectangular parallelepiped, a prismoid, and the like.

In these configurations, the polyhedron which is a hexahedron is used, and the third virtual object is confined in the closed space formed in a cube, a rectangular parallelepiped, or the like. When the cube, the rectangular parallelepiped, or the like is unfolded, the second virtual object can appear. Thus, the virtual objects can be switched while realizing a natural augmented reality effect.

Preferably, the program may cause the computer to further function as operation means for operating the second virtual object in accordance with an operation performed by a user.

In these configurations, it is possible to perform information processing for realizing the shooting game in which, for example, a character which acts in accordance with an operation performed by a user is disposed as the second virtual object, and the character is caused to shoot the targets.

Preferably, the program may cause the computer to further function as: detection means for detecting a predetermined object, from the photographed image data which is sequentially acquired by the photographed image data acquisition means; calculation means for calculating a relative positional relationship between the imaging device and the predetermined object, based on a result of the detection of the predetermined object; and virtual camera setting means for sequentially setting the virtual camera in a virtual space based on a result of calculation performed by the calculation means. In this case, the object image generation means may generate the object image by taking images of the first virtual object and the second virtual object by means of the virtual camera.

In these configurations, while realizing a natural augmented reality effect, the first virtual object changes from the opened shape to the closed shape, and the targets which are the virtual objects can be switched to different targets. In this case, a user can become interested in the change (from the opened shape to the closed shape) of the shape of the first virtual object, the change (the second virtual object becomes visible as the first virtual object approaches the opened shape) of the position and orientation of the second virtual object, and the change (the third virtual object disappears as the first virtual object approaches the closed shape) of the position and orientation of the third virtual object.

An information processing apparatus according to a second aspect of exemplary embodiments of the present invention includes: imaging means; display means for displaying a real space so as to be visible on a screen; storage means for storing object data representing a first virtual object in which a closed space is formed, and object data representing a second virtual object positioned in the closed space; photographed image data acquisition means for sequentially acquiring photographed image data representing a photographed image taken by the imaging means; first object control means for changing a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape; second object control means for positioning at least one second virtual object on the inner surfaces of the first virtual object, and changing a position and an orientation of the second virtual object in cooperation with the inner surfaces of the first virtual object in accordance with the first virtual object changing from the closed shape to the opened shape; texture mapping means for mapping, as a texture, an image of a region corresponding to the first virtual object of the opened shape, on the inner surfaces of the first virtual object, the image of the region corresponding to the first virtual object of the opened shape being a corresponding part of the photographed image represented by the photographed image data which is sequentially acquired by the photographed image data acquisition means; object image generation means for generating an object image based on each of the second virtual object, and the first virtual object on which the texture is mapped; and display control means for displaying, by means of the display means, a superimposed image in which the object image generated by the object image generation means is superimposed on the real space on the screen.

An information processing system according to a third aspect of exemplary embodiments of the present invention includes: imaging means; display means for displaying a real space so as to be visible on a screen; storage means for storing object data representing a first virtual object in which a closed space is formed, and object data representing a second virtual object positioned in the closed space; photographed image data acquisition means for sequentially acquiring photographed image data representing a photographed image taken by the imaging means; first object control means for changing a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape; second object control means for positioning at least one second virtual object on the inner surfaces of the first virtual object, and changing a position and an orientation of the second virtual object in cooperation with the inner surfaces of the first virtual object in accordance with the first virtual object changing from the closed shape to the opened shape; texture mapping means for mapping, as a texture, an image of a region corresponding to the first virtual object of the opened shape, on the inner surfaces of the first virtual object, the image of the region corresponding to the first virtual object of the opened shape being a corresponding part of the photographed image represented by the photographed image data which is sequentially acquired by the photographed image data acquisition means; object image generation means for generating an object image based on each of the second virtual object, and the first virtual object on which the texture is mapped; and display control means for displaying, by means of the display means, a superimposed image in which the object image generated by the object image generation means is superimposed on the real space on the screen.

An information processing method according to a fourth aspect of exemplary embodiments of the present invention includes: imaging step of taking a photographed image by means of an imaging device; display step of displaying an image by means of a display device; storage step of storing object data representing a first virtual object in which a closed space is formed, and object data representing a second virtual object positioned in the closed space; photographed image data acquisition step of sequentially acquiring photographed image data representing a photographed image taken by the imaging device; first object control step of changing a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape; second object control step of positioning at least one second virtual object on the inner surfaces of the first virtual object, and changing a position and an orientation of the second virtual object in cooperation with the inner surfaces of the first virtual object in accordance with the first virtual object changing from the closed shape to the opened shape; texture mapping step of mapping, as a texture, an image of a region corresponding to the first virtual object of the opened shape, on the inner surfaces of the first virtual object, the image of the region corresponding to the first virtual object of the opened shape being a corresponding part of the photographed image represented by the photographed image data which is sequentially acquired by the photographed image data acquisition step; object image generation step of generating an object image based on each of the second virtual object, and the first virtual object on which the texture is mapped; and display control step of displaying, by means of the display step, a superimposed image in which the object image generated by the object image generation step is superimposed on the real space on the screen.

The information processing apparatus according to the second aspect of exemplary embodiments of the present invention, the information processing system according to the third aspect of exemplary embodiments of the present invention, and the information processing method according to the fourth aspect of exemplary embodiments of the present invention realize the same operation and effect as obtained by the computer-readable storage medium according to the first aspect of exemplary embodiments of the present invention.

According to exemplary embodiments of the present invention, by applying an augmented reality system, the virtual object which is displayed so as to be superimposed on a real world can be caused to appear or can be changed such that a realized natural augmented reality effect is not spoiled, and a user can become interested in an image displayed at the appearance or the change.

These and other objects, features, aspects and advantages of exemplary embodiments of the present invention will become more apparent from the following detailed description of exemplary embodiments of the present invention when taken in conjunction with the accompanying drawings.

BRIEF DESCRIPTION OF THE DRAWINGS

FIG. 9 is a diagram illustrating virtual object data shown in FIG. 8;

FIG. 13 is a diagram illustrating a state which is displayed on the upper LCD 22 when a first stage of a shooting game starts;

FIG. 14C is being folded;

DESCRIPTION OF THE PREFERRED EMBODIMENTS

Hereinafter, a game apparatus will be described as an information processing apparatus according to one embodiment of the present invention. The present invention is not limited to such an apparatus. Exemplary embodiments of the present invention may be implemented as an information processing program executed by such an apparatus, or as an information processing system associated with such an apparatus. Further, exemplary embodiments of the present invention may be implemented as an information processing method. In the present embodiment, a game performed by the game apparatus is a target shooting game. In the target shooting game, virtual objects such as targets are confined in a hexahedron forming a closed space when stages of the game are switched. When the hexahedron is unfolded, virtual objects of the subsequent stage appear. However, the present invention is not limited to such a shooting game. Further, the closed space may not necessarily be formed by a hexahedron.

Figure 1:
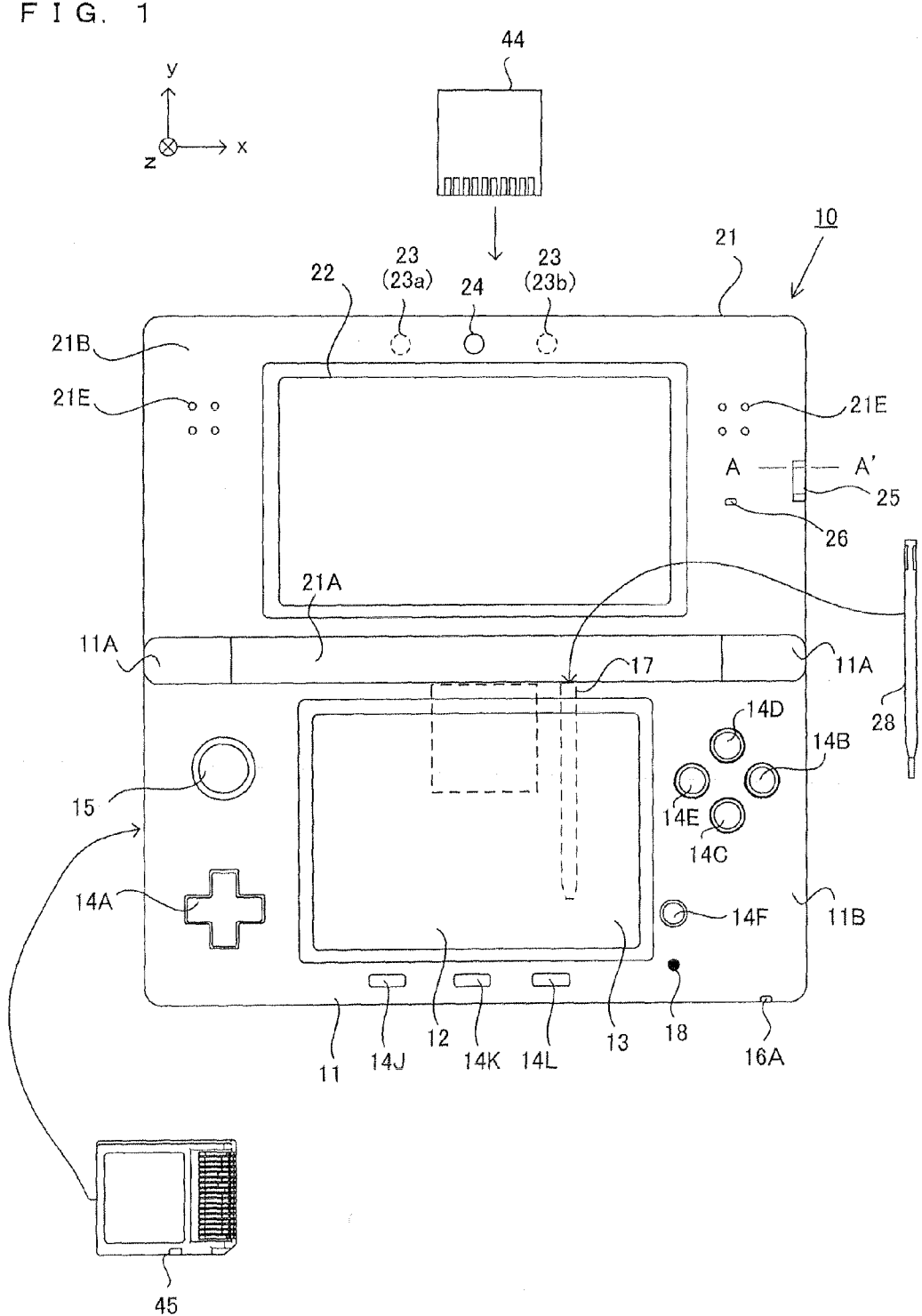
FIG. 1 is a front view of a game apparatus 10 in an opened state.
Figure 2:
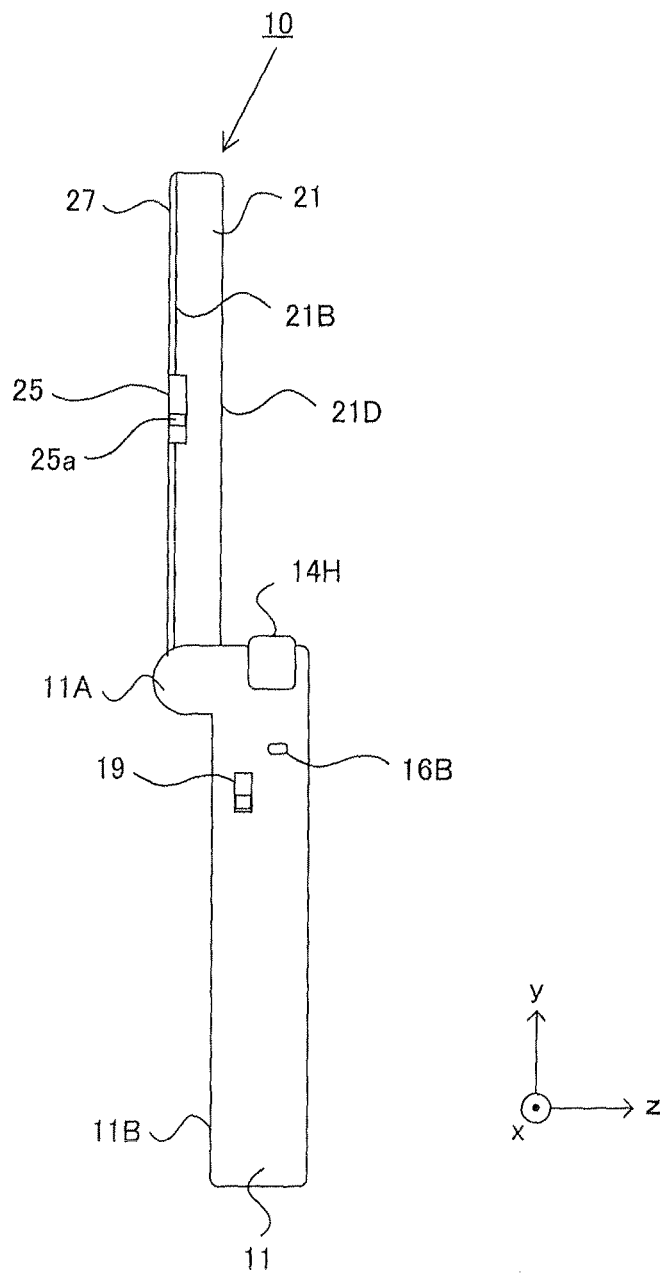
FIG. 2 is a side view of the game apparatus 10 in the opened state.
Figure 3:
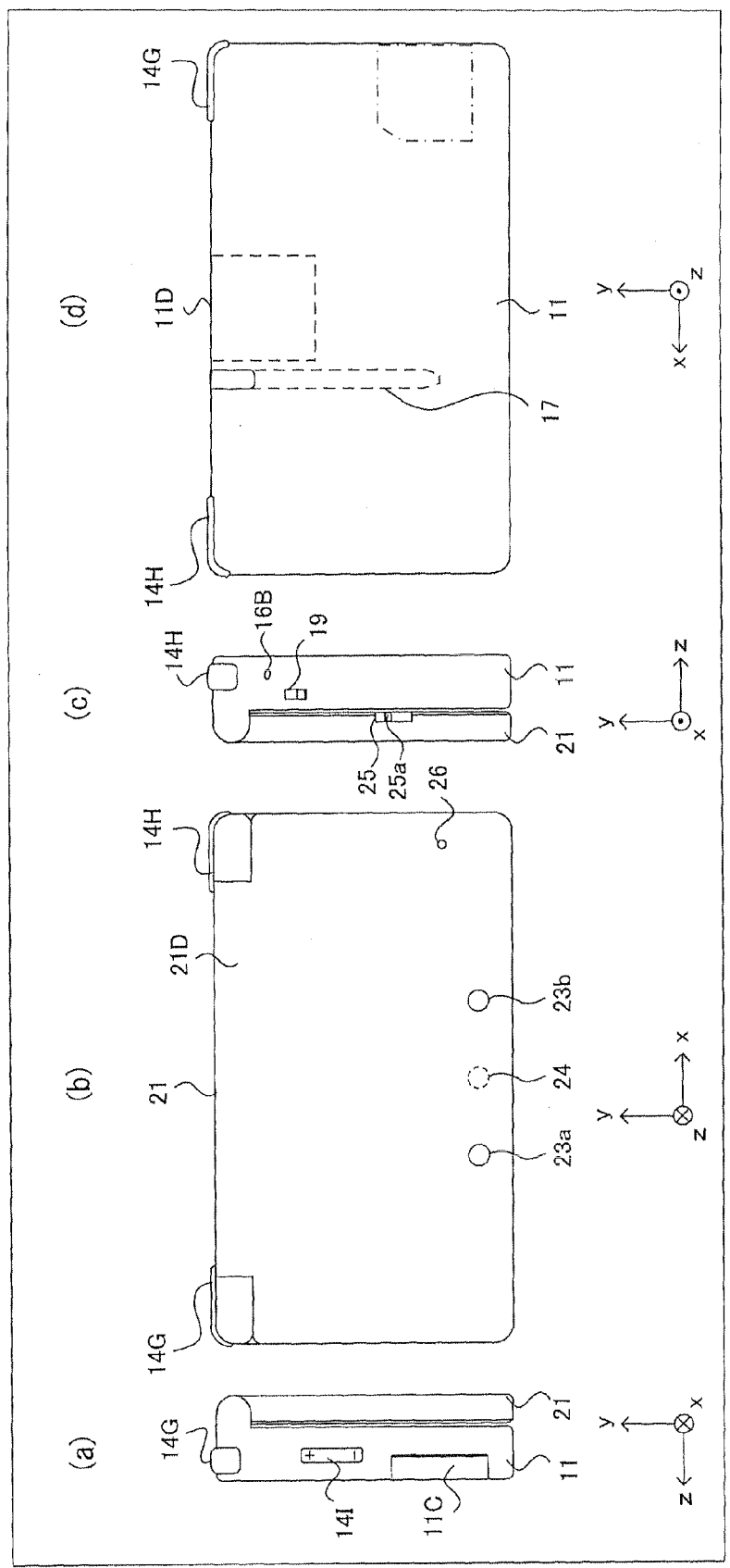
FIG. 3 is a left side view, a front view, a right side view, and a rear view of the game apparatus 10 in a closed state.

FIG. 1 to FIG. 3 are each a plan view of an outer appearance of a game apparatus 10. The game apparatus 10 is a hand-held game apparatus, and is configured to be foldable as shown in FIG. 1 to FIG. 3. FIG. 1 and FIG. 2 show the game apparatus 10 in an opened state, and FIG. 3 shows the game apparatus 10 in a closed state. FIG. 1 is a front view of the game apparatus 10 in the opened state, and FIG. 2 is a right side view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 3. The game apparatus 10 includes a lower housing 11 and an upper housing 21 as shown in FIG. 1 to FIG. 3. The lower housing 11 and the upper housing 21 are connected to each other so as to be openable and closable (foldable). In the present embodiment, the lower housing 11 and the upper housing 21 are each formed in a horizontally long plate-like rectangular shape, and are connected to each other at long side portions thereof so as to be pivotable with respect to each other.

As shown in FIG. 1 and FIG. 2, projections 11A each of which projects in a direction orthogonal to an inner side surface (main surface) 11B of the lower housing 11 are provided at the upper long side portion of the lower housing 11, whereas a projection 21A which projects from the lower side surface of the upper housing 21 in a direction orthogonal to the lower side surface of the upper housing 21 is provided at the lower long side portion of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3, in the lower housing 11, a lower LCD (Liquid Crystal Display) 12, a touch panel 13, operation buttons 14A to 14L (FIG. 1, FIG. 3), an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening of the lower housing 11. When the game apparatus 10 is not used, the game apparatus 10 is in the closed state, thereby preventing the screen of the lower LCD 12 from becoming unclean and damaged. The number of pixels of the lower LCD 12 may be, for example, 256 dots×192 dots (the horizontal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 3(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Four buttons, that is, the button 14B, the button 14C, the button 14D, and the button 14E, which are positioned so as to form a cross shape, are positioned such that a thumb of a right hand with which the lower housing 11 is held is naturally positioned on the positions of the four buttons. Further, the four buttons and the analog stick 15 are disposed on opposite sides of the lower LCD 12, so as to be bilaterally symmetrical in position with respect to each other. Thus, depending on a game program, for example, a left-handed person can make a direction instruction input by using these four buttons.

Further, the microphone hole 18 is provided on the inner side surface of the lower housing 11. Under the microphone hole 18, a microphone (see FIG. 7) is provided as a sound input device described below, and the microphone detects for a sound from the outside of the game apparatus 10.

FIG. 3(*a*) is a left side view of the game apparatus 10 in the closed state. FIG. 3(*b*) is a front view of the game apparatus 10 in the closed state. FIG. 3(*c*) is a right side view of the game apparatus 10 in the closed state. FIG. 3(*d*) is a rear view of the game apparatus 10 in the closed state. As shown in FIG. 3(*b*) and FIG. 3(*d*), an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H act as shutter buttons (imaging instruction buttons) of the imaging section. Further, as shown in FIG. 3(*a*), a sound volume button 14I is provided on the left side surface of the lower housing 11. The sound volume button 14I is used for adjusting a sound volume of a speaker of the game apparatus 10.

As shown in FIG. 3(*a*), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10. The connector and the cover section 11C may be provided on the right side surface of the lower housing 11.

Further, as shown in FIG. 3(*d*), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10. The connector and the insertion opening 11D may be provided on another side surface (for example, the right side surface) of the lower housing 11.

Further, as shown in FIG. 1 and FIG. 3(*c*), a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 3(*c*)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 3, in the upper housing 21, an upper LCD (Liquid Crystal Display) 22, an outer imaging section 23 (an outer imaging section (left) 23*a* and an outer imaging section (right) 23*b*), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

Figure 4:
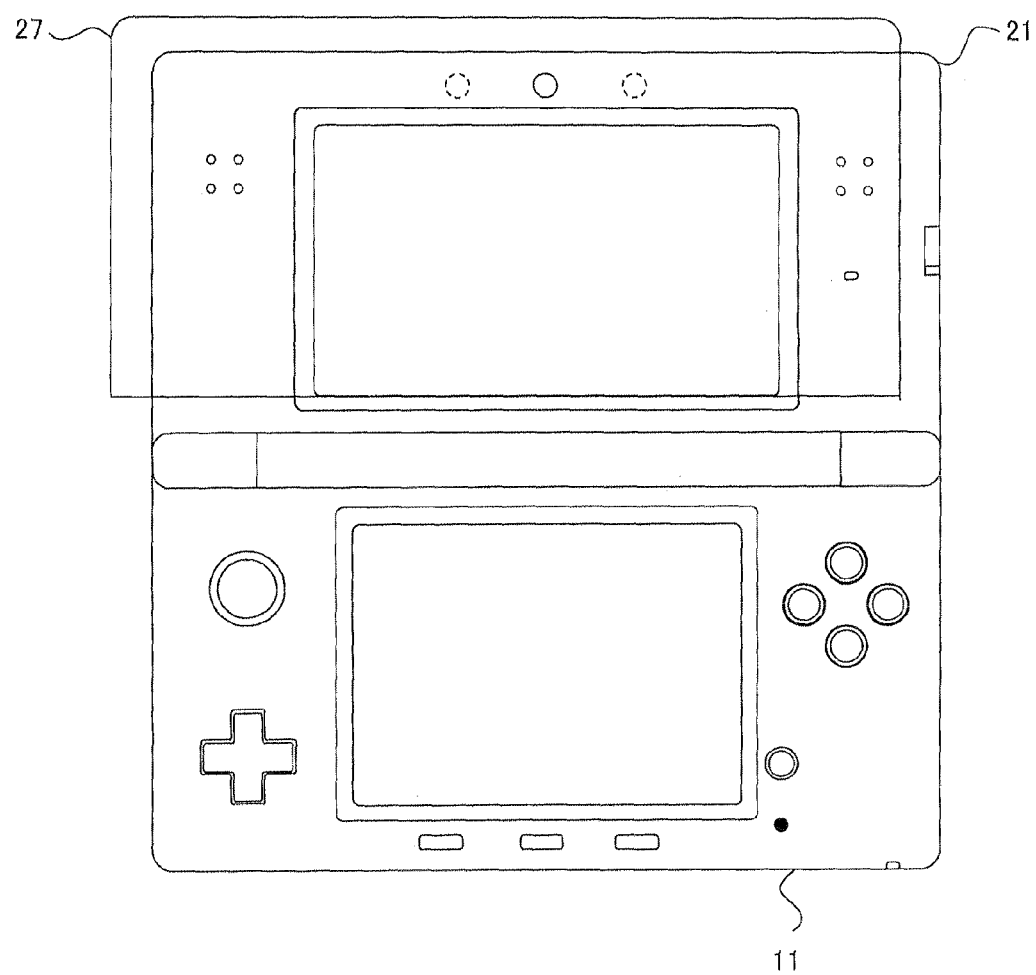
FIG. 4 is a diagram illustrating a state in which a screen cover 27 is removed from an inner side surface of an upper housing 21.

The screen of the upper LCD 22 is provided on the inner side surface (main surface) 21B of the upper housing 21, and the screen of the upper LCD 22 is exposed at an opening of the upper housing 21. Further, as shown in FIG. 2 and FIG. 4, the inner side surface of the upper housing 21 is covered with a transparent screen cover 27. FIG. 4 is an exploded view illustrating a state in which the screen cover 27 is removed from the inner side surface of the upper housing 21. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23*a* and 23*b*) provided on the outer side surface (the back surface reverse of the main surface on which the upper LCD 22 is provided) 21D of the upper housing 21 are generically referred to as the outer imaging section 23. The imaging directions of the outer imaging section (left) 23*a* and the outer imaging section (right) 23*b* are each the same as the outward normal direction of the outer side surface 21D. Further, these imaging sections are each designed so as to be positioned in a direction which is opposite to the normal direction of the display surface (inner side surface) of the upper LCD 22 by 180 degrees. Specifically, the imaging direction of the outer imaging section (left) 23*a* and the imaging direction of the outer imaging section (right) 23*b* are parallel to each other. The outer imaging section (left) 23*a* and the outer imaging section (right) 23*b* can be used as a stereo camera depending on a program executed by the game apparatus 10. Further, depending on a program, when any one of the two outer imaging sections (23*a* and 23*b*) is used alone, the outer imaging section 23 may be used as a non-stereo camera. Further, depending on a program, images taken by the two outer imaging sections (23*a* and 23*b*) may be combined with each other or may compensate for each other, thereby enabling imaging using an extended imaging range.

In the present embodiment, the outer imaging section 23 is structured so as to include two imaging sections, that is, the outer imaging section (left) 23*a* and the outer imaging section (right) 23*b*. Each of the outer imaging section (left) 23*a* and the outer imaging section (right) 23*b* includes an imaging device, such as a CCD image sensor or a CMOS image sensor, having a common predetermined resolution, and a lens. The lens may have a zooming mechanism.

As indicated by dashed lines in FIG. 1 and by solid lines in FIG. 3(*b*), the outer imaging section (left) 23*a* and the outer imaging section (right) 23*b* forming the outer imaging section 23 are aligned so as to be parallel to the horizontal direction of the screen of the upper LCD 22. Specifically, the outer imaging section (left) 23*a* and the outer imaging section (right) 23*b* are positioned such that a straight line connecting between the two imaging sections is parallel to the horizontal direction of the screen of the upper LCD 22. Reference numerals 23*a* and 23*b* which are indicated as dashed lines in FIG. 1 represent the outer imaging section (left) 23*a* and the outer imaging section (right) 23*b*, respectively, which are positioned on the outer side surface reverse of the inner side surface of the upper housing 21. As shown in FIG. 1, when a user views the screen of the upper LCD 22 from the front thereof, the outer imaging section (left) 23*a* is positioned to the left of the upper LCD 22 and the outer imaging section (right) 23*b* is positioned to the right of the upper LCD 22. When a program for causing the outer imaging section 23 to function as a stereo camera is executed, the outer imaging section (left) 23*a* takes an image for a left eye, which is viewed by a left eye of a user, and the outer imaging section (right) 23*b* takes an image for a right eye, which is viewed by a right eye of the user. A distance between the outer imaging section (left) 23*a* and the outer imaging section (right) 23*b* is set so as to be approximately the same as a distance between both eyes of a person, that is, may be set so as to be within a range from 30 mm to 70 mm, for example, However, the distance between the outer imaging section (left) 23*a* and the outer imaging section (right) 23*b* is not limited to a distance within the range described above.

In the present embodiment, the outer imaging section (left) 23*a* and the outer imaging section (right) 23*b* are secured to the housing, and the imaging directions thereof cannot be changed.

Further, the outer imaging section (left) 23*a* and the outer imaging section (right) 23*b* are positioned to the left and to the right, respectively, of the upper LCD 22 (on the left side and the right side, respectively, of the upper housing 21) so as to be horizontally symmetrical with respect to the center of the upper LCD 22. Specifically, the outer imaging section (left) 23*a* and the outer imaging section (right) 23*b* are positioned so as to be symmetrical with respect to a line which divides the upper LCD 22 into two equal parts, that is, the left part and the right part. Further, the outer imaging section (left) 23*a* and the outer imaging section (right) 23*b* are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23*a* and the outer imaging section (right) 23*b* are positioned, on the outer side surface of the upper housing 21, at a position above the upper edge of the screen of the upper LCD 22 having been projected.

As described above, the two imaging sections (23*a* and 23*b*) of the outer imaging section 23 are positioned to the left and the right of the upper LCD 22 so as to be horizontally symmetrical with respect to the center of the upper LCD 22.

Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1 and FIG. 3(*b*), the inner imaging section 24 is positioned on the inner side surface of the upper housing 21 at a position reverse of the middle position between the left and the right imaging sections (the outer imaging section (left) 23*a* and the outer imaging section (right) 23*b*) of the outer imaging section 23. Specifically, when the left and the right imaging sections of the outer imaging section 23 provided on the outer side surface of the upper housing 21 are projected on the inner side surface of the upper housing 21, the inner imaging section 24 is positioned at the middle position between the left and the right imaging sections having been projected. The dashed line 24 indicated in FIG. 3(*b*) represents the inner imaging section 24 positioned on the inner side surface of the upper housing 21.

As described above, the inner imaging section 24 is used for taking an image in the direction opposite to that of the outer imaging section 23. The inner imaging section 24 is positioned on the inner side surface of the upper housing 21 at a position reverse of the middle position between the left and the right imaging sections of the outer imaging section 23. Thus, when a user views the upper LCD 22 from the front thereof, the inner imaging section 24 can take an image of a face of the user from the front thereof. Further, the left and the right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1 to FIG. 3, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. Further, an operation section of the 3D adjustment switch 25 projects on the inner side surface and the right side surface, and can be viewed and operated from both sides. All the switches other than the 3D adjustment switch 25 are provided on the lower housing 11.

Figure 5:
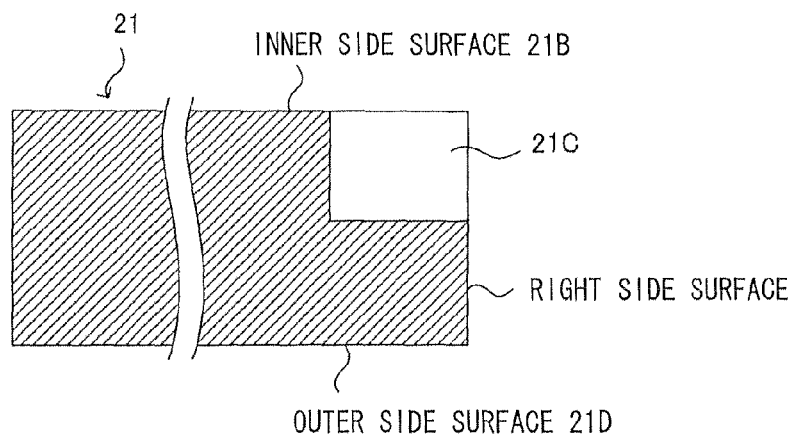
FIG. 5 is a cross-sectional view of the upper housing 21 shown in FIG. 1 taken along a line A-A'.

FIG. 5 is a cross-sectional view of the upper housing 21 shown in FIG. 1 taken along a line A-A'. As shown in FIG. 5, a recessed portion 21C is formed at the right end portion of the inner side surface of the upper housing 21, and the 3D adjustment switch 25 is provided in the recessed portion 21C. The 3D adjustment switch 25 is provided so as to be visible from the front surface and the right side surface of the upper housing 21 as shown in FIG. 1 and FIG. 2. A slider 25*a* of the 3D adjustment switch 25 is slidable to any position in a predetermined direction (along the longitudinal direction of the right side surface), and a display mode of the upper LCD 22 is determined in accordance with the position of the slider 25*a*.

Figure 6A:
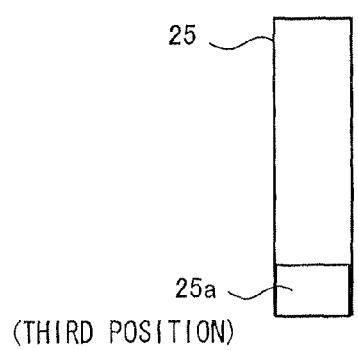
FIG. 6A is a diagram illustrating a state in which a slider 25a of a 3D adjustment switch 25 is positioned at a lowermost position (a third position)
Figure 6B:
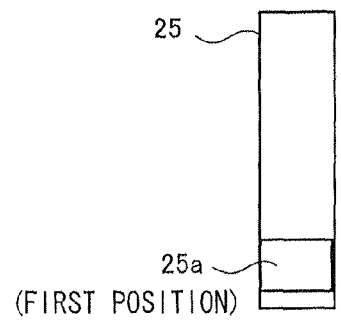
FIG. 6B is a diagram illustrating a state in which the slider 25a of the 3D adjustment switch 25 is positioned above the lowermost position (a first position)
Figure 6C:
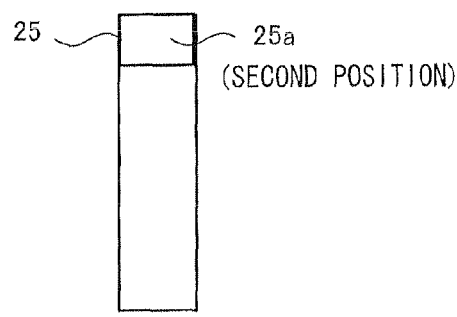
FIG. 6C is a diagram illustrating a state in which the slider 25a of the 3D adjustment switch 25 is positioned at an uppermost position (a second position)

FIG. 6A to FIG. 6C are each a diagram illustrating a state in which the slider 25*a* of the 3D adjustment switch 25 slides. FIG. 6A is a diagram illustrating a state in which the slider 25*a* of the 3D adjustment switch 25 is positioned at the lowermost position (a third position). FIG. 6B is a diagram illustrating a state in which the slider 25*a* of the 3D adjustment switch 25 is positioned above the lowermost position (a first position). FIG. 6C is a diagram illustrating a state in which the slider 25*a* of the 3D adjustment switch 25 is positioned at the uppermost position (a second position).

As shown in FIG. 6A, when the slider 25*a* of the 3D adjustment switch 25 is positioned at the lowermost position (the third position), the upper LCD 22 is set to the planar display mode, and a planar image is displayed on the screen of the upper LCD 22 (the upper LCD 22 may remain set to the stereoscopic display mode, and the same image may be used for the image for a left eye and the image for a right eye, to perform planar display). On the other hand, when the slider 25*a* is positioned between a position shown in FIG. 6B (a position (first position) above the lowermost position) and a position shown in FIG. 6C (the uppermost position (the second position)), the upper LCD 22 is set to the stereoscopic display mode. In this case, a stereoscopically visible image is displayed on the screen of the upper LCD 22. When the slider 25*a* is positioned between the first position and the second position, a manner in which the stereoscopic image is visible is adjusted in accordance with the position of the slider 25*a*. Specifically, an amount of deviation in the horizontal direction between a position of an image for a right eye and a position of an image for a left eye is adjusted in accordance with the position of the slider 25*a*. The slider 25*a* of the 3D adjustment switch 25 is configured so as to be fixed at the third position, and is slidable, along the longitudinal direction of the right side surface, to any position between the first position and the second position. For example, the slider 25*a* is fixed at the third position by a projection (not shown) which projects, from the side surface of the 3D adjustment switch 25, in the lateral direction shown in FIG. 6A, and does not slide upward from the third position unless a predetermined force or a force greater than the predetermined force is applied upward. When the slider 25*a* is positioned between the third position and the first position, the manner in which the stereoscopic image is visible is not adjusted, which is intended as a margin. In another embodiment, the third position and the first position may be the same position, and, in this case, no margin is provided. Further, the third position may be provided between the first position and the second position. In this case, a direction in which an amount of deviation in the horizontal direction between a position of an image for a right eye and a position of an image for a left eye is adjusted when the slider is moved from the third position toward the first position, is opposite to a direction in which an amount of deviation in the horizontal direction between the position of the image for the right eye and the position of the image for the left eye is adjusted when the slider is moved from the third position toward the second position.

The program executed by the game apparatus according to the present embodiment includes a program for displaying a stereoscopic photograph, and a program for displaying a stereoscopic CG image. The program for displaying a stereoscopic CG image is used for taking an image of a virtual space by means of a virtual camera for a left eye and a virtual camera for a right eye to generate an image for the left eye and an image for the right eye. The game apparatus according to the present embodiment adjusts the stereoscopic effect by changing a distance between the two virtual cameras in accordance with the position of the slider 25a of the 3D adjustment switch 25 when executing such a program.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed (namely, image processing in which an image for a left eye is different from an image for a right eye is performed in the case of the 3D adjustment switch being positioned between the first position and the second position) in a state where the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 descried below.

(Internal Configuration of Game Apparatus 10)

Figure 7:
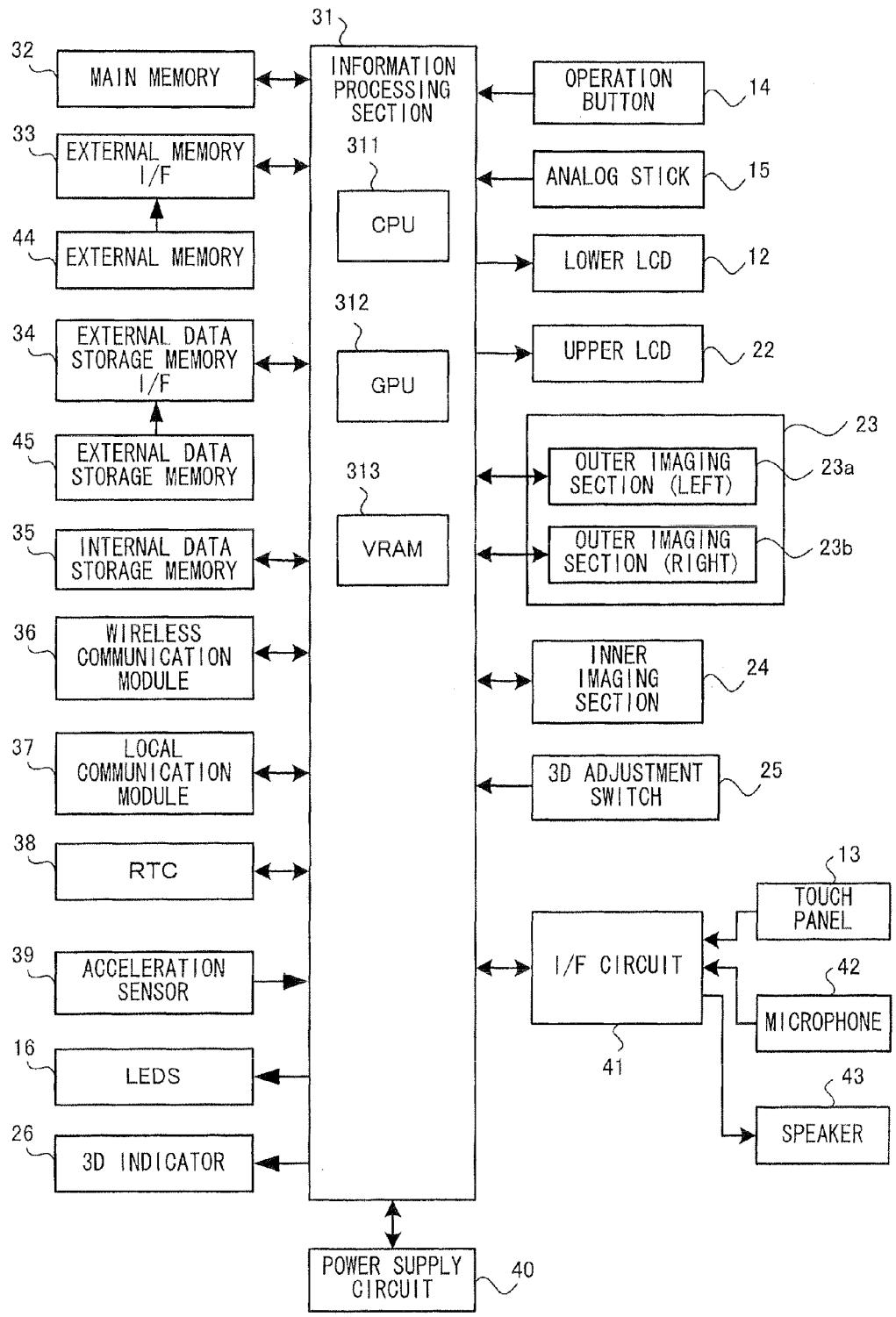
FIG. 7 is a block diagram illustrating an internal configuration of the game apparatus 10.

Next, an internal electrical configuration of the game apparatus 10 will be described with reference to FIG. 7. FIG. 7 is a block diagram illustrating an internal configuration of the game apparatus 10. As shown in FIG. 7, the game apparatus 10 includes, in addition to the components described above, electronic components such as an information processing section 31, a main memory 32, an external memory interface (external memory I/F) 33, an external data storage memory OF 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes a virtual object display process (FIG. 10) described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the virtual object display process, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14L is outputted from the operation button 14 to the information processing section 31, and the input state indicates whether or not each of the operation buttons 14A to 14L has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13. When the information processing section 31 (the CPU 311) detects that the imaging section is selected, the information processing section 31 instructs one of the outer imaging section 32 or the inner imaging section 24 to take an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. In the present embodiment, the information processing section 31 lights up the 3D indicator 26 when the upper LCD 22 is in the stereoscopic display mode. The game apparatus 10 has the internal configuration as described above.

(Details of Virtual Object Display Process)

Figure 8:
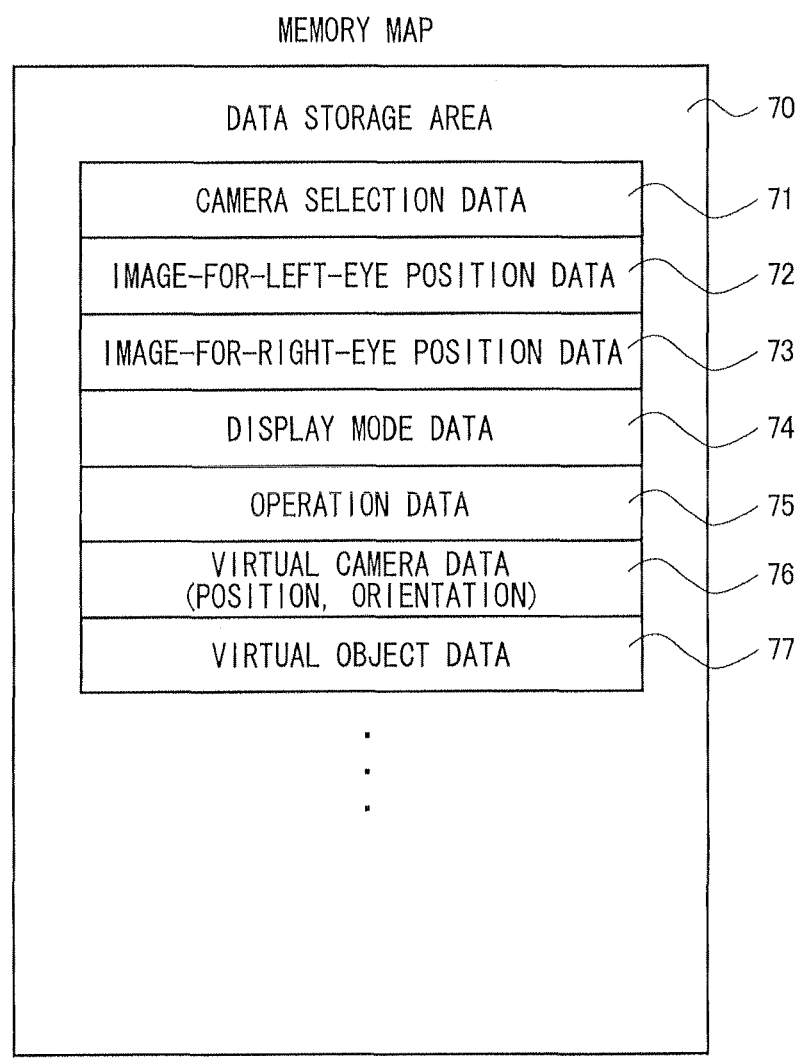
FIG. 8 is a diagram illustrating a memory map of a main memory 32 of the game apparatus 10.

Next, a virtual object display process according to the present embodiment will be described in detail with reference to FIG. 8 to FIG. 12. Initially, main data to be stored in the main memory 32 when the virtual object display process is executed will be described. FIG. 8 is a diagram illustrating a memory map of the main memory 32 of the game apparatus 10. As shown in FIG. 8, the main memory 32 has a data storage area 70. Camera selection data 71, image-for-left-eye position data 72, image-for-right-eye position data 73, display mode data 74, operation data 75, virtual camera data (position, orientation) 76, virtual object data 77, and the like are stored in the data storage area 70. In addition to the data described above, programs for executing the imaging process described above, data representing a touch position on the touch panel 13, data representing an image which is displayed on the lower LCD 12 for selection of a camera, and the like are stored in the main memory 32. In the following description, the "imaging section" may be referred to as a "camera".

The camera selection data 71 represents the imaging section which has been most recently selected. The camera selection data 71 indicates whether the most recently selected imaging section is the outer imaging section 23 or the inner imaging section 24.

The image-for-left-eye position data 72 represents a position at which the image for a left eye which has been taken by the outer imaging section (left) 23a is displayed on the upper LCD 22, and represents a coordinate value of the image center of the image for the left eye. The image-for-right-eye position data 73 represents a position at which the image for a right eye which has been taken by the outer imaging section (right) 23b is displayed on the upper LCD 22, and represents a coordinate value of the image center of the image for the right eye.

The display mode data 74 indicates whether the display mode of the upper LCD 22 is the stereoscopic display mode or the planar display mode.

The operation data 75 represents an operation performed on each of the operation buttons 14A to 14E and 14G to 14H, and the analog stick 15. The operation data 75 represents an operation for moving a character or an operation for causing a character to perform the shooting, in, for example, the shooting game in which a character representing a user is displayed on a screen.

The virtual camera data 76 is position data and orientation data representing a position and an orientation, respectively, of the virtual camera, which are calculated in a marker coordinate system based on marker recognition result described below.

The virtual object data 77 represents virtual objects displayed in a virtual space. Specifically, the virtual object data 77 indicates, for each stage of the shooting game, the virtual objects to be displayed in the stage, as shown in FIG. 9.

As shown in FIG. 9, in the virtual object data, the virtual objects displayed in each stage are assigned virtual object numbers, respectively. The virtual objects are represented by virtual object names, position data representing the plane positions (in the marker coordinate system), and rotation axis data by using the virtual object numbers as keys, respectively. The virtual object data may not be necessarily represented by those described above.

The virtual object data 77 represents data of virtual objects which are positioned, when a hexahedron forming a closed space is completely unfolded, on the layed-flat surfaces of the unfolded hexahedron, as described below. Specifically, the virtual objects are virtual objects to be confined in the closed space formed by the hexahedron. In the present embodiment, the hexahedron is a regular hexahedron. The position data representing the plane positions indicates positions of the virtual objects, respectively, which are positioned on the layed-flat surfaces of the completely unfolded hexahedron forming the closed space. When the hexahedron formed by six surfaces to be layed flat shifts from an opened state to a closed state, or shifts from the closed state to the opened state, positions and orientations of the virtual objects positioned on the surfaces of the hexahedron are changed in accordance with the form of the hexahedron being changed. At this time, one side of the bottom surface among the surfaces of the hexahedron on which the virtual objects are positioned acts as the center of rotation about which the corresponding virtual objects are rotated, and therefore data representing the one side is stored as the rotation axis data.

Figure 10:
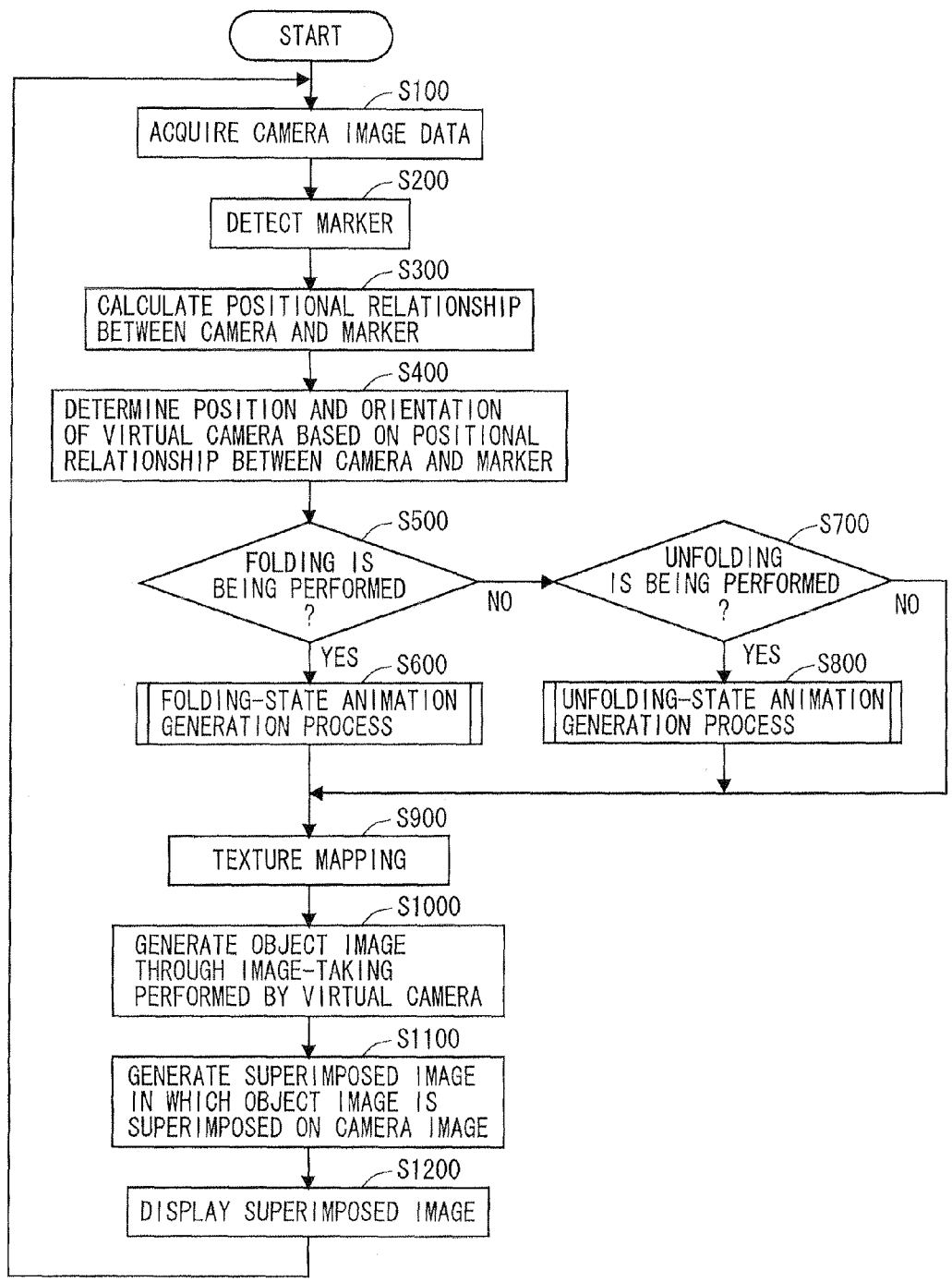
FIG. 10 is a main flow chart showing in detail a virtual object display process according to one embodiment.
Figure 11:
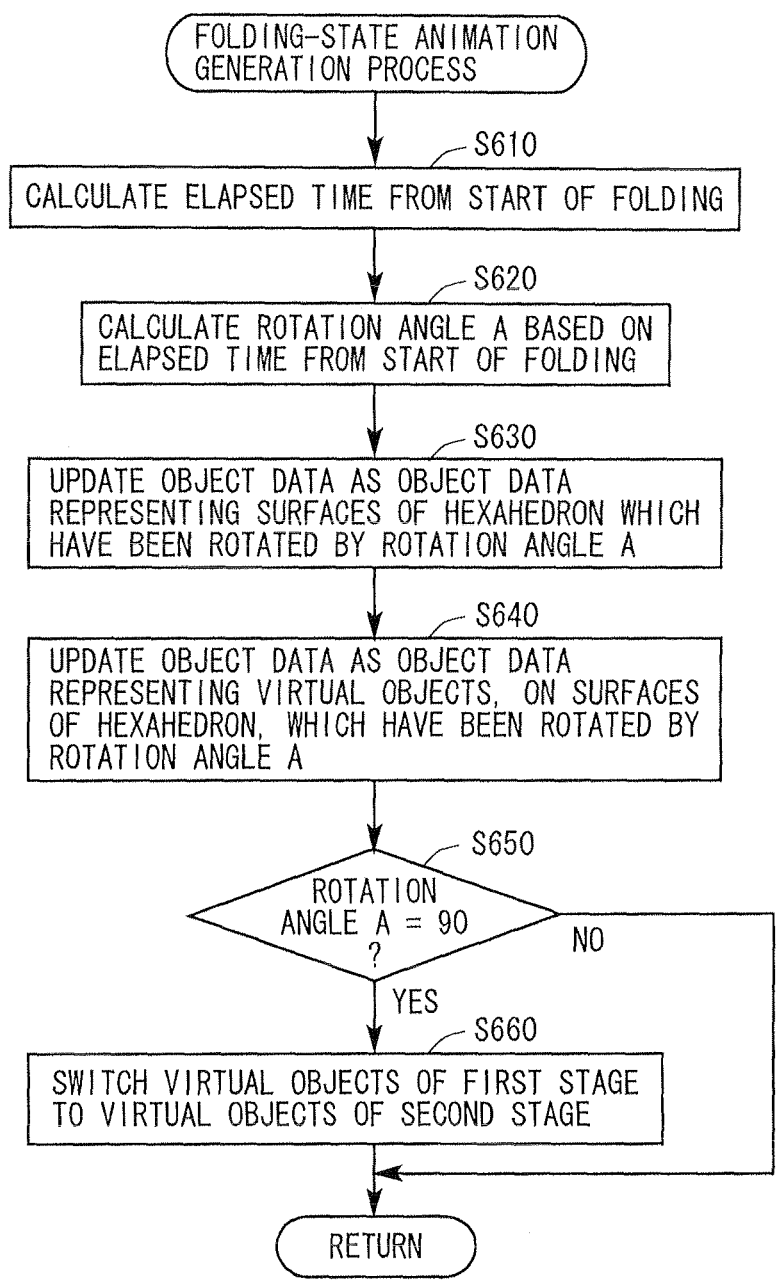
FIG. 11 is a flow chart showing in detail a folding-state animation generation process (step S600) shown in FIG. 10.
Figure 12:
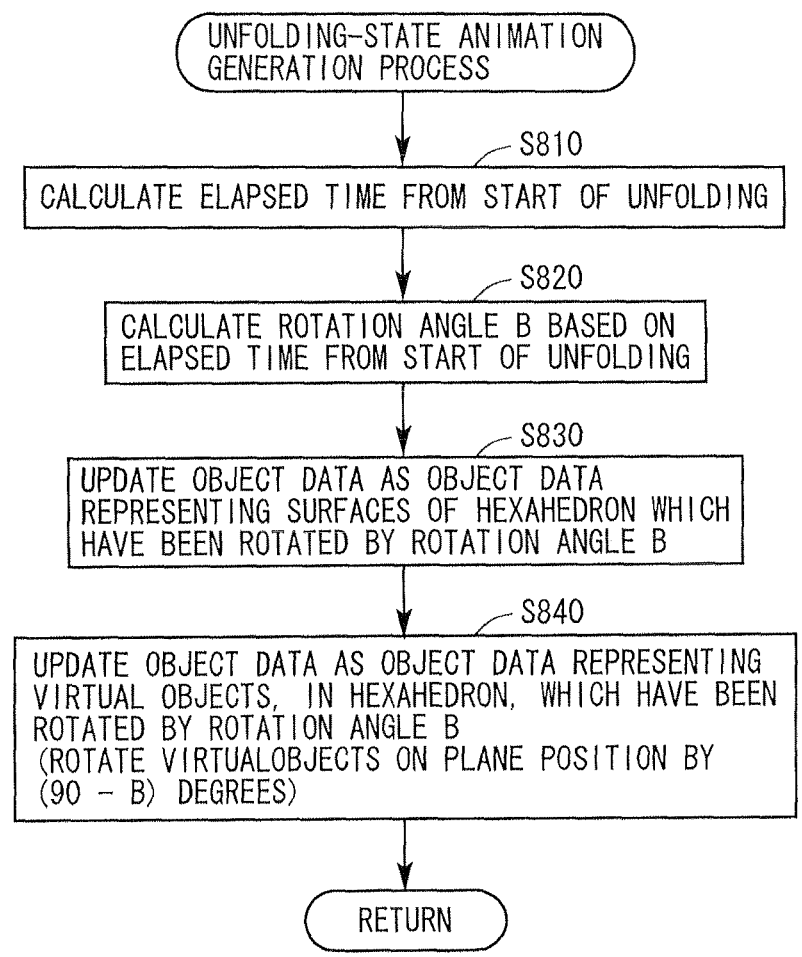
FIG. 12 is a flow chart showing in detail an unfolding-state animation generation process (step S800) shown in FIG. 10.

Next, the virtual object display process will be described in detail with reference to FIG. 10 to FIG. 12. FIG. 10 is a main flow chart showing the virtual object display process (main routine) according to the present embodiment. FIG. 11 is a flow chart showing a folding-state animation generation process (sub-routine) of S600 shown in FIG. 10. FIG. 12 is a flow chart showing an unfolding-state animation generation process (sub-routine) of S800 shown in FIG. 10.

When the game apparatus 10 is powered on, the information processing section 31 (the CPU 311) of the game apparatus 10 executes a start-up program stored in a ROM which is not shown, thereby initializing the respective units such as the main memory 32. Next, a virtual object display program stored in the internal data storage memory 35 is loaded to the main memory 32, and the execution of the program is started by the CPU 311 of the information processing section 31. An image including the virtual objects is also displayed on the upper LCD 22 by using programs other than those described above. However, the programs other than those described above are less related to the fundamental part of the present invention, and the description thereof is not given.

A process loop of step S100 to step S1200 shown in FIG. 10 is repeatedly executed in each frame (one frame corresponds to, for example, 1/30 seconds, and this is referred to as a frame time or a cycle time). Since the program is repeatedly executed, the following animation is displayed when stages are switched in the shooting game.

For example, when the game of the first stage successfully resolves, the layed-flat surfaces of the hexahedron appear on the positions at which the virtual objects including targets of the shooting game are positioned. The hexahedron is folded, to confine, in the hexahedron, the virtual objects (the targets to be shot) of the first stage. Subsequently, the hexahedron is unfolded to display virtual objects (smaller targets to be shot) of the second stage. The layed-flat surfaces of the hexahedron disappear, and the second stage (which has difficulty level higher than the first stage) is started. When the stages are switched, an animation representing the state described above is displayed by the program shown in FIG. 10 being repeatedly executed. After the virtual objects of the first stage are confined in the hexahedron, the virtual objects of the second stage are positioned on the inner surfaces of the hexahedron instead of the virtual objects of the first stage. However, since each surface of the hexahedron does not transmit the virtual objects, the switching from the virtual objects of the first stage to the virtual objects of the second stage is not displayed as an animation.

Further, in the following description, the outer imaging section 23 is selected as the imaging section, and the stereoscopic display mode is selected as the display mode. However, exemplary embodiments of the present invention may be applied to the planar display mode as well as the stereoscopic display mode. Further, the information processing section 31 previously obtains positional information for the layed-flat surfaces of the unfolded hexahedron, which is not described with reference to the following flow charts. At this time, the layed-flat surfaces of the unfolded hexahedron may be set such that the layed-flat surfaces are displayed at predetermined positions so as to have predetermined sizes, respectively. Alternatively, the positions and the sizes of the layed-flat surfaces of the unfolded hexahedron may be determined, based on the positioning of the virtual objects obtained when each stage is ended, so as to display the virtual objects on the layed-flat surfaces of the unfolded hexahedron. In this case, each of the virtual objects to be confined when the hexahedron is folded needs to be positioned on any of the layed-flat surfaces of the unfolded hexahedron. The surfaces of the hexahedron are disposed such that the side surfaces (four surfaces) are positioned adjacent to four sides, respectively, of the bottom surface, and the top surface is positioned adjacent to any one of the side surfaces.

Initially, a main routine of the virtual object display process will be described with reference to FIG. 10. In step S100, the information processing section 31 acquires camera image data. Specifically, the information processing section 31 acquires image data representing an image photographed by a most recently selected camera, and stores the image data in the VRAM 313. In the present embodiment, the outer imaging section 23 is selected, and therefore the information processing section 31 acquires a right real world image and a left real world image each of which is photographed by the outer imaging section 23.

In step S200, the information processing section 31 detects the image photographed by the outer imaging section 23 for a marker. In the present embodiment, the marker includes a black square outline printed around the center of a piece of white paper, and an outline arrow printed in the square outline. However, the marker may not necessarily have such a shape, pattern, and color. The marker may have any shape, pattern, and color when the shape, pattern, and color enable identification of the position (positions of four points in the present embodiment) and the direction of the marker. Specifically, the information processing section 31 initially extracts an area formed by four line segments being connected, from the image photographed by the outer imaging section 23, and determines a pattern image in the extracted area formed by the four line segments. The information processing section 31 calculates a degree of similarity between pattern image data representing the determined pattern image and pattern image data which is previously stored in the external memory 44. When a value representing the degree of similarity which indicates the result of the calculation is greater than or equal to a predetermined threshold value, the marker is detected.

In step S300, the information processing section 31 calculates a positional relationship between the outer imaging section 23 (the game apparatus 10) and the marker, based on the result of the marker detection. In this case, for example, one of the outer imaging section 23 or the marker is used as a reference, and a three-dimensional position and orientation of the other of the outer imaging section 23 or the marker with respect to the reference is calculated as the positional relationship. As the process for calculating the positional relationship, a process similar to a process in a conventional technique for an augmented reality can be used.

In step S400, the information processing section 31 determines a position and an orientation of the virtual camera based on the positional relationship between the outer imaging section 23 and the marker. At this time, since the stereoscopic display mode is selected, the information processing section 31 calculates a position and an orientation of the virtual camera for a left eye based on the camera image data acquired by the outer imaging section (left) 23a, and calculates a position and an orientation of the virtual camera for a right eye based on the camera image data acquired by the outer imaging section (right) 23b. When the position and the orientation of the virtual camera are calculated, a view matrix of the virtual camera is calculated based on the positional relationship between the outer imaging section 23 and the marker, and the position and the orientation of the virtual camera are calculated based on the view matrix of the virtual camera having been calculated. The position data and the orientation data representing the determined position and the determined orientation, respectively, of the virtual camera are stored as the virtual camera data 76 in the data storage area 70 of the main memory 32. Further, the position and the orientation calculated, for one of the virtual cameras, based on the camera image data may be used to calculate the position and the orientation of the other of the virtual cameras.

In step S500, the information processing section 31 determines whether or not the hexahedron is being folded. At this time, it is determined that the hexahedron is being folded, until a predetermined first time period elapses after the first stage has ended and shifting to the second stage has been determined. When it is determined that the hexahedron is being folded (YES in step S500), the process shifts to S600. Otherwise (NO in step S500), the process shifts to S700.

In step S600, the information processing section 31 performs the folding-state animation generation process. The folding-state animation generation process of step S600 is shown as a sub-routine, and will be described below in detail. Thereafter, the process shifts to step S900.

In step S700, the information processing section 31 determines whether or not the hexahedron is being unfolded. At this time, it is determined that the hexahedron is being unfolded, until a predetermined second time period elapses after the hexahedron has been folded. When it is determined that the hexahedron is being unfolded (YES in step S700), the process shifts to S800. Otherwise (NO in step S700), the process shifts to S900.

In step S800, the information processing section 31 performs the unfolding-state animation generation process. The unfolding-state animation generation process of step S800 is shown as a sub-routine, and will be described below in detail. Thereafter, the process shifts to step S900.

In step S900, the information processing section 31 maps the photographed images on the inner surfaces of the polygons representing the layed-flat surfaces of the unfolded hexahedron, and maps the object images on the polygons representing the virtual objects (the texture mapping). Further, the information processing section 31 maps a predetermined image on the outer surfaces of the polygon representing the layed-flat surfaces of the unfolded hexahedron, and changes the photographed images on the positions opposing the outer surfaces of the polygon, to a predetermined image (which may be an image different from the predetermined image described above).

In step S1000, the information processing section 31 causes the virtual camera to take an image of the polygons on which the images are mapped, to generate object image (hexahedron image and virtual object images) data. At this time, since the stereoscopic display mode is selected, the object image for a left eye is generated based on a position and an orientation of the virtual camera for a left eye, and the object image for a right eye is generated based on a position and an orientation of the virtual camera for a right eye.

In step S1100, the information processing section 31 superimposes the object images on a camera image based on the camera image data and the object image data, to generate a superimposed image. At this time, since the stereoscopic display mode is selected, the information processing section 31 generates a superimposed image for a left eye by superimposing the object images for the left eye on a camera image photographed by the outer imaging section (left) 23a, and generates a superimposed image for a right eye by superimposing the object images for the right eye on a camera image photographed by the outer imaging section (right) 23b.

In step S1100, a process for appearance of the layed-flat surfaces of the hexahedron and a process for disappearance of the layed-flat surfaces of the hexahedron are also performed. In this case, in the process for appearance of the layed-flat surfaces of the hexahedron, a color of the layed-flat surfaces of the hexahedron may be changed, or a color of a border line (that is, the sides of the layed-flat surfaces) of the layed-flat surfaces of the hexahedron may be changed, to enable the appearance of the layed-flat surfaces of the hexahedron. Particularly, it is preferable that the color gradually changes from a color similar to a color of the photographed image to a color different therefrom such that the layed-flat surfaces of the hexahedron appear so as to project, thereby preventing sudden appearance of the layed-flat surfaces of the hexahedron. Further, in the process for disappearance of the layed-flat surfaces of the hexahedron, a color of the layed-flat surfaces of the hexahedron or a color of a border line (that is, the sides of the layed-flat surfaces) of the layed-flat surfaces of the hexahedron may be changed, to enable the disappearance of the layed-flat surfaces of the hexahedron. Particularly, it is preferable that the color gradually changes from a color different from a color of the photographed image to a color similar thereto such that the layed-flat surfaces of the hexahedron disappear so as to sink, thereby preventing sudden disappearance of the layed-flat surfaces of the hexahedron.

In step S1200, the information processing section 31 displays, on the upper LCD 22, the superimposed image in which the virtual object images are superimposed on the camera image. At this time, the superimposed image for the left eye and the superimposed image for the right eye are combined with each other so as to be stereoscopically visible. Thereafter, the process is returned to step S100, and the process described above is repeated.

When the hexahedron is being neither folded nor unfolded (NO in step S500 and NO in step S700), it is determined that switching of the stages is being not performed. In this case, an image in which the photographed image is superimposed on the virtual object images is displayed (step S900 to step S1200), and a user progresses the shooting game by the game process program, which is not represented in the flow charts, being executed.

Next, a sub-routine of the folding-state animation generation process will be described with reference to FIG. 11. In step S610, the information processing section 31 calculates an elapsed time from the start of the folding.

In step S620, the information processing section 31 calculates a rotation angle A based on the elapsed time from the start of the folding of the hexahedron. At this time, the information processing section 31 calculates the rotation angle A as, for example, (elapsed time)×(a folding rotation angle per unit time). The rotation angle A is greater than or equal to 0 degrees and not greater than 90 degrees. When the elapsed time is calculated based on the cycle time for the main flow chart, the folding rotation angle per unit time may be set as a rotation angle per the cycle time. The elapsed time and the folding rotation angle per unit time are determined so as to realize an animation representing a state in which the hexahedron is being smoothly folded. In the first time period described above, the surfaces of the hexahedron rotate 90 degrees, to completely fold the hexahedron.

In step S630, the information processing section 31 updates object data so as to represent the hexahedron the surfaces of which have rotated by the rotation angle A in the folding direction. At this time, the bottom surface among the surfaces of the hexahedron does not rotate, and the side surfaces rotate by the rotation angle A about the sides, respectively, of the bottom surface, and the top surface rotates by the rotation angle A about the side of one of the side surfaces. As a result, the top surface rotates by twice the rotation angle A with respect to the bottom surface.

In step S640, the information processing section 31 updates object data so as to represent the virtual objects, on the surfaces of the hexahedron, which have rotated by the rotation angle A in the folding direction. At this time, the object data is updated so as to represent the virtual objects each of which has rotated, in the folding direction, by the rotation angle A about a rotation axis based on the rotation axis data stored for each virtual object. More specifically, the virtual objects positioned on the bottom surface among the surfaces of the hexahedron do not rotate, and the virtual objects positioned on the side surfaces rotate by the rotation angle A about the rotation axes (the sides of the bottom surface), respectively, and the virtual objects positioned on the top surface rotate by the rotation angle A about the rotation axis (the side of one of the side surfaces). As a result, the virtual objects positioned on the top surface rotate by twice the rotation angle A with respect to the bottom surface.

In step S650, the information processing section 31 determines whether or not the rotation angle A is 90 degrees (namely, whether or not the folding is to be ended). When the rotation angle A is 90 degrees (YES in step S650), the process shifts to step S660. Otherwise (NO in step S650), the process is ended (returned to the main routine).

In step S660, the information processing section 31 replaces the virtual objects of the first stage with the virtual objects of the second stage. Thereafter, the process is ended (returned to the main routine).

Next, a sub-routine for the unfolding-state animation generation process will be described with reference to FIG. 12. In step S810, the information processing section 31 calculates an elapsed time from the start of the unfolding of the hexahedron.

In step S820, the information processing section 31 calculates a rotation angle B based on the elapsed time from the start of the unfolding. At this time, the information processing section 31 calculates the rotation angle B as, for example, (elapsed time)×(an unfolding rotation angle per unit time). The rotation angle B is greater than or equal to 0 degrees and not greater than 90 degrees. When the elapsed time is calculated based on the cycle time for the main flow chart, the unfolding rotation angle per unit time may be set as a rotation angle per the cycle time. The elapsed time and the unfolding rotation angle per unit time are determined so as to realize an animation representing a state in which the hexahedron is being smoothly unfolded. In the second time period described above, the surfaces of the hexahedron rotate 90 degrees, to completely unfold the hexahedron. Further, a rotation direction for increasing the rotation angle A and a rotation direction for increasing the rotation angle B are opposite to each other.

In step S830, the information processing section 31 updates object data so as to represent the hexahedron the surfaces of which have rotated by the rotation angle B in the unfolding direction. At this time, the bottom surface among the surfaces of the hexahedron does not rotate, and the side surfaces rotate by the rotation angle B about the sides, respectively, of the bottom surface, and the top surface rotates by the rotation angle B about the side of one of the side surfaces. As a result, the top surface rotates by twice the rotation angle B with respect to the bottom surface.

In step S840, the information processing section 31 updates object data so as to represent the virtual objects, on the surfaces of the hexahedron, which have rotated by the rotation angle B in the unfolding direction. At this time, the object data is updated so as to represent the virtual objects each of which has rotated, in the unfolding direction, by the rotation angle B about a rotation axis based on the rotation axis data represented by the virtual object data 77 stored in the data storage area 70. More specifically, the virtual objects positioned on the bottom surface among the surfaces of the hexahedron do not rotate, and the virtual objects positioned on the side surfaces rotate by the rotation angle B about the rotation axes (the sides of the bottom surface), respectively, and the virtual objects positioned on the top surface rotate by the rotation angle B about the rotation axis (the side of one of the side surfaces). As a result, the virtual objects positioned on the top surface rotate by twice the rotation angle B with respect to the bottom surface. The process as described above is a process for rotating the virtual objects on the plane position by a rotation angle of (90-B) degrees. The position data of the virtual objects on the plane position are stored as the virtual object data 77, for each virtual object, in the data storage area 70, and therefore the positions of the virtual objects on the surfaces being unfolded are calculated by using the stored position data. Thereafter, the process is ended (returned to the main routine).

The operation performed by the game apparatus 10 according to the present embodiment based on the configuration and the flow charts as described above will be described with reference to FIG. 13 to FIG. 16. In FIG. 13 to FIG. 16, the game apparatus 10 performs a process for a shooting game. In the shooting game, a character representing a user is not displayed, and an arrow is shot in a user's line of sight direction (the direction in which the outer side surface of the upper housing 21 of the game apparatus 10 faces) by the user pressing a predetermined button (for example, the operation button 14B). Therefore, when a target which is not opposing the user's line of sight direction is aimed at, the user needs to change the direction in which the outer side surface of the upper housing 21 of the game apparatus 10 faces, so as to face the front of the target toward the user, thereby shooting an arrow. In the following description, when arrows which are shot in the manner as described above hit all the targets, a first stage is cleared, and the stage shifts to a second stage having a higher difficulty level (for example, a stage in which the number of targets is increased, and/or the targets face in various directions). However, the application of the present invention is not limited to such a shooting game.

(Operation for Displaying Folding of Hexahedron)

A user makes settings such that the outer imaging section 23 is selected, and the stereoscopic display mode is selected, and the program described above is executed. When, for example, a user photographs an range including the marker on a desk, by using the outer imaging section 23, the camera image data is acquired (step S100). When the marker is detected (step S200), a positional relationship between the outer imaging section 23 and the marker is calculated based on the result of the detection of the marker (step S300), and the position and orientation of the virtual camera is determined based on the positional relationship having been calculated (step S400).

As described above, the first stage of the shooting game is started as shown in FIG. 13. The virtual objects (a house, a tree, a target A, a target B, and a target C which are stored as the virtual objects of the first stage as shown in FIG. 9) are superimposed on the image which includes the marker and is photographed by the outer imaging section 23, and the superimposed image is displayed on the upper LCD 22 in a stereoscopically visible manner. Further, at this time, the virtual objects are displayed so as to provide a natural augmented reality effect.

Figure 14A:
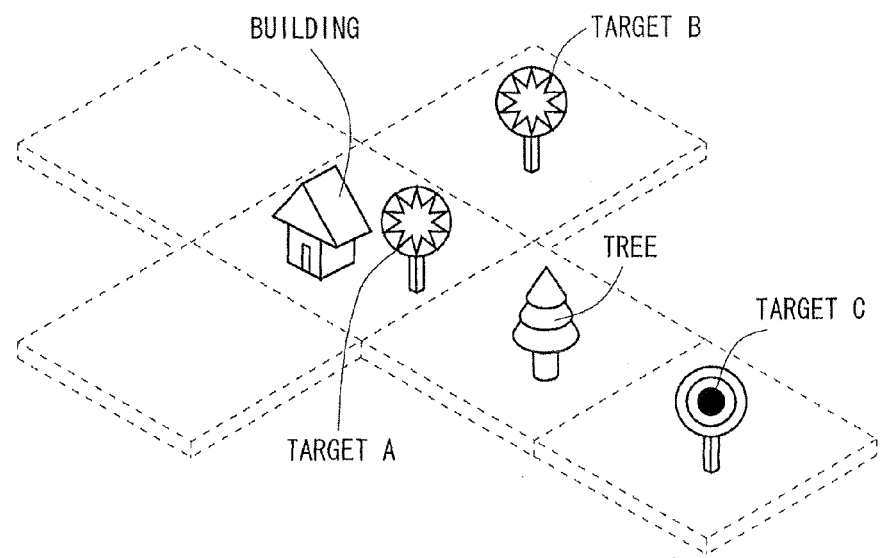
FIG. 14A is a diagram illustrating an animation image displayed on the upper LCD 22.

A user seeing the image displayed on the upper LCD 22 as shown FIG. 13 plays the shooting game in the following manner. The user moves or tilts the game apparatus 10 to display the target at the center of the screen of the upper LCD 22. When the user presses the operation button 14B after the target is aimed at in such a manner, the arrow is shot in the user's line of sight direction (the direction in which the outer side surface of the upper housing 21 of the game apparatus 10 faces). When the target is hit, the target is broken. FIG. 13 shows a state displayed when the first stage is started. When the first stage is started, a user plays the game in the manner as described above, and attempts to hit the target with the arrow. For example, when the user hits the target A and the target B with the arrows, the target A and the target B having been broken are displayed as shown in FIG. 14A. In the first stage, all the targets face in the same direction as shown in FIG. 13 and FIG. 14A.

Figure 14B:
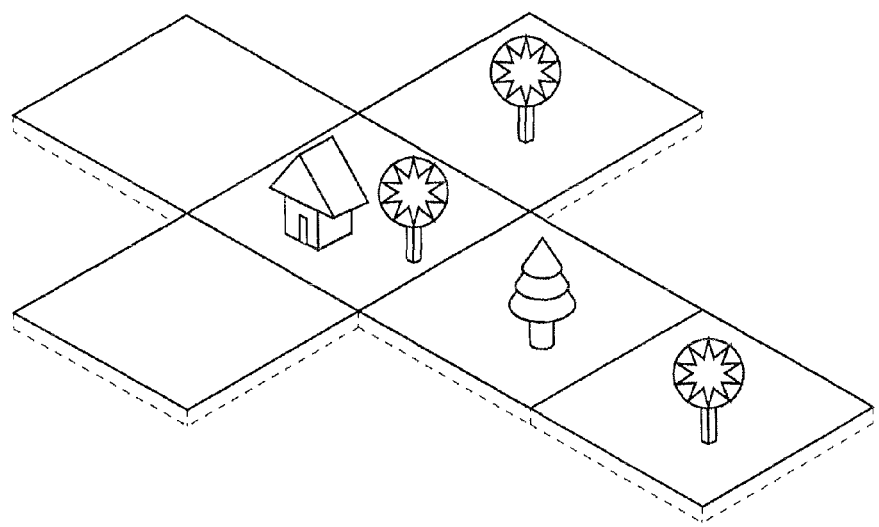
FIG. 14B is a diagram illustrating an animation image generated when the layed-flat surfaces of an unfolded hexahedron appear in a state shown in FIG. 14A.

When the user hits the target C with the arrow in the state shown in FIG. 14A, all the targets (the target A, the target B, and the target C) have been broken as shown in FIG. 14B. At this time, it is determined that the first stage is ended (cleared), and the stage shifts to the second stage.

It is determined that the hexahedron is being folded (YES in step S500) until the first time period elapses after the first stage has been ended, and shifting to the second stage has been determined, as shown in FIG. 14B. An elapsed time from the start of the folding of the hexahedron is calculated (step S610), and the layed-flat surfaces of the hexahedron which are represented when the rotation angle A is 0 degrees are each displayed on a predetermined position so as to have a predetermined size as shown in FIG. 14B. At this time, a color of the layed-flat surfaces of the hexahedron or a color of the sides of the layed-flat surfaces of the hexahedron may be gradually changed from a state indicated by the dotted line in FIG. 14A to a state indicated by a solid line in FIG. 14B such that the layed-flat surfaces of the hexahedron gradually appear so as to project. Further, although the surfaces of the hexahedron are shown as plate-like surfaces having the thickness in the present embodiment, the thickness may be reduced so as not to be displayed on the upper LCD 22.

Figure 14C:
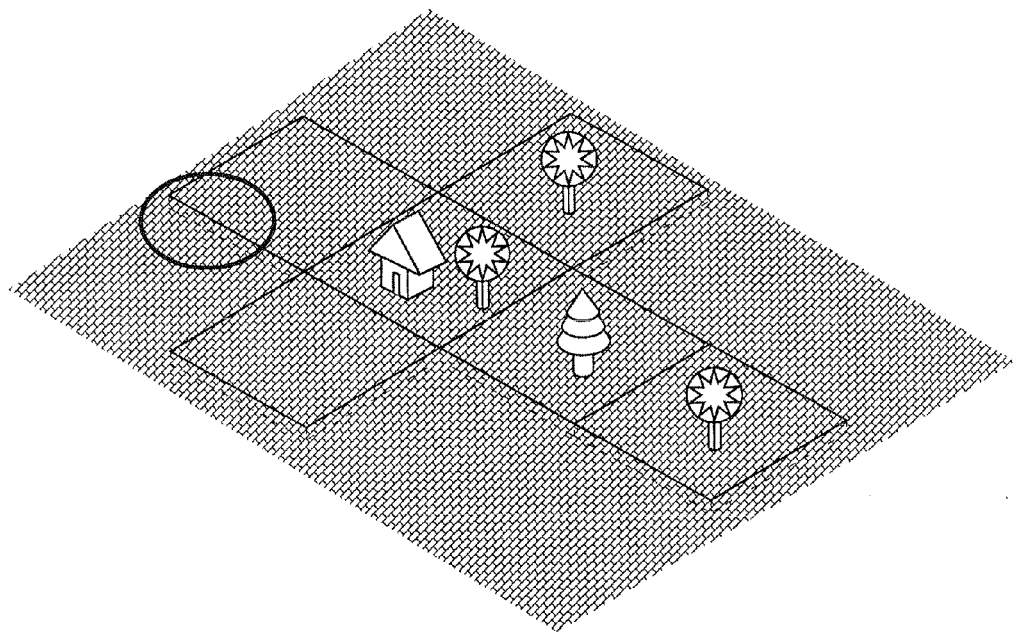
FIG. 14C is a diagram illustrating a state in which a photographed image is textured-mapped on the layed-flat surfaces of the unfolded hexahedron in the state shown in FIG. 14B.
Figure 14D:
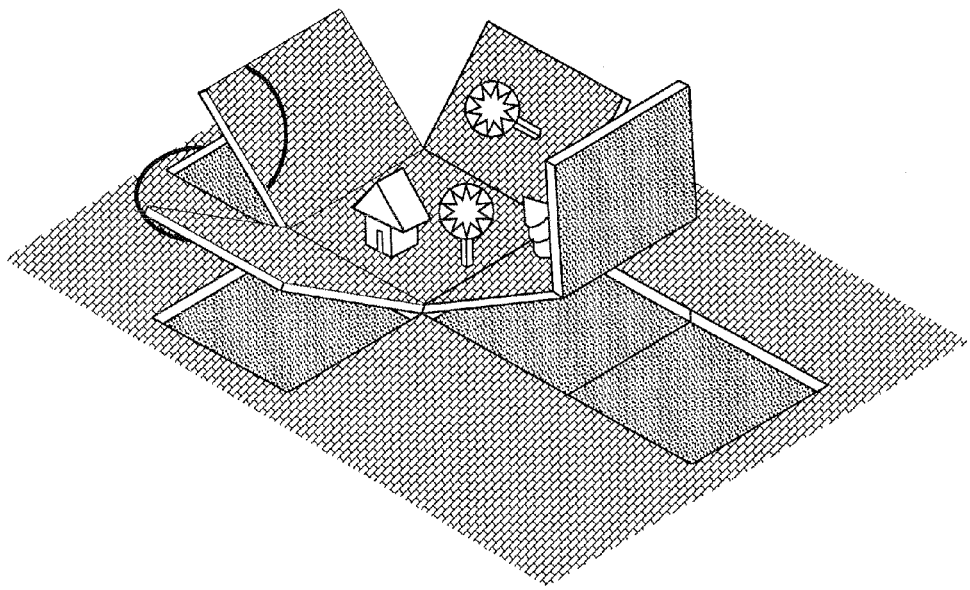
FIG. 14D is a diagram illustrating a state in which the hexahedron in the state shown

The hexahedron is being folded over time. FIG. 14C shows a state in which the photographed image is texture-mapped on the layed-flat inner surfaces of the hexahedron shown in FIG. 14B. FIG. 14D shows a state obtained when the time has elapsed in the state shown in FIG. 14C.

While the hexahedron is being folded (YES in step S500) until the first time period elapses after the clearing of the first stage and the start of the folding, the rotation angle A is calculated based on the elapsed time from the start of the folding (step S620), to update the object data representing the surfaces of the hexahedron, as the object data representing the surfaces of the hexahedron which have been rotated by the rotation angle A (step S630), and to update the object data representing the virtual objects (the house, the tree, and the targets of the first stage) positioned on the surfaces of the hexahedron, as the object data representing the virtual objects which have been rotated by the rotation angle A (step S640).

On the inner surfaces of the polygons representing the surfaces of the hexahedron having been rotated by the rotation angle A as described above, the photographed image for the region corresponding to the inner surfaces is mapped, and objects images are mapped on polygons representing the virtual objects (the house, the tree, and the targets of the first stage) (step S900). At this time, a predetermined image is mapped on the outer surfaces of the polygon representing the surfaces of the hexahedron, and the photographed image for the region opposing the outer surfaces is changed to the predetermined image.

As described above, the hexahedron is folded, and a state (a state for the rotation angle A indicating 0 degrees) shown in FIG. 14C shifts to a state (a state for the rotation angle A indicating about 45 degrees) as shown in FIG. 14D. As shown in FIG. 14D, the photographed image is texture-mapped on the inner surfaces of the hexahedron being folded, and the virtual objects on the surfaces of the hexahedron are rotated in accordance with the surfaces of the hexahedron being rotated. Further, as shown in FIG. 14D, a predetermined image is mapped on the outer surfaces of the hexahedron, and the photographed image for the region opposing the outer surfaces is changed to the same predetermined image.

The process for rotating and displaying the virtual objects as described above can be realized by the position and orientation of each virtual object in the world coordinate system being changed and then processed. The present invention is not limited to any specific manner, and any manner for changing (rotating) the positions and orientations of the virtual objects positioned on the surfaces of the hexahedron in accordance with the hexahedron being folded or unfolded, may be used.

Figure 14E:
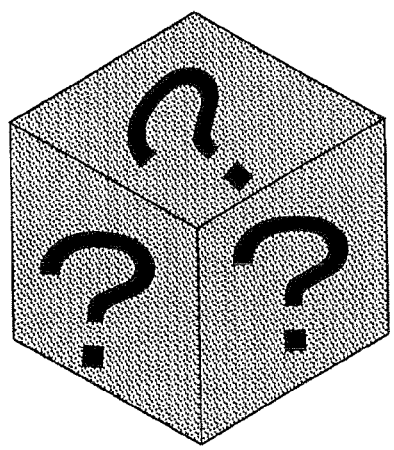
FIG. 14E is a diagram illustrating a state in which the hexahedron in the state shown in FIG. 14D has been completely folded.

As described above, the process of folding the hexahedron is performed until the first time period elapses after the start of the folding, and the hexahedron is completely folded as shown in FIG. 14E when the first time period has elapsed. As shown in FIG. 14E, when the hexahedron is completely folded, question marks are displayed on the outer surfaces of the hexahedron.

Further, as described above, when the first time period has elapsed, the hexahedron is completely folded as shown in FIG. 14E, and the virtual objects of the first stage is confined in the hexahedron. At this time, the virtual objects (a building, a cone, and the smaller targets of the second stage) of the second stage are positioned on the inner surfaces of the hexahedron instead of the virtual objects (the house, the tree, and the targets of the first stage) of the first stage (step S660). Each surface of the hexahedron does not transmit the virtual objects, and therefore an animation of switching from the virtual objects of the first stage to the virtual objects of the second stage is not displayed. Therefore, a sudden change from the virtual objects of the first stage to the virtual objects of the second stage is invisible to a user, and the user does not feel unnatural.

In FIG. 14C to FIG. 14E, a state of continuous change is not represented. However, the main flow shown in the flow chart of FIG. 10 is repeated in a cycle of about ⅓₀ seconds in practice. Therefore, the following animation is displayed. When a user clears the first stage, the layed-flat surfaces of the hexahedron appear, the hexahedron is folded, and the virtual objects (the house, the tree, and the targets of the first stage) on the surfaces are rotated in accordance with the rotation of the surfaces of the hexahedron which is being folded. The hexahedron is completely folded, and the virtual objects (the house, the tree, and the targets of the first stage) become invisible. A state in which the hexahedron has been completely folded as shown in FIG. 14E may be maintained for a predetermined time period.

As shown in FIG. 14C to FIG. 14E, when, for example, the marker is positioned on a desk in a real space, and the shooting game is played on the desk, a displayed screen represents a state where the surfaces of the desk are peeled off when the hexahedron is folded. Further, at this time, when the marker is positioned on a lawn in the real space instead of the desk, and the shooting game is played on the lawn, an image representing the ground (the ground is under the lawn) is displayed on a portion at which the lawn is removed. Further, the image representing the ground is also displayed on the outer surfaces of the hexahedron. Thus, the enhanced natural augmented reality effect is realized.

It is determined that the hexahedron is being unfolded (YES in step S700) until a predetermined second time period elapses after the hexahedron has been folded as shown in FIG. 14E. An elapsed time from the start of the unfolding of the hexahedron is calculated (step S810), and the unfolding of the hexahedron shown in FIG. 14E is started.

The hexahedron is being unfolded over time. While the hexahedron is being unfolded (YES in step S700) until the second time period elapses after the hexahedron has been completely folded, the rotation angle B is calculated based on the elapsed time from the start of the unfolding (step S820), to update the object data representing the surfaces of the hexahedron, as the object data representing the surfaces of the hexahedron which have been rotated by the rotation angle B (the rotation reverse of the rotation in step S630) (step S830), and to update the object data representing the virtual objects (the building, the cone, and the smaller targets of the second stage) positioned on the surfaces of the hexahedron, as the object data representing the virtual objects having been rotated by the rotation angle B (step S830).

At this time, the virtual objects (the building, the cone, and the smaller targets of the second stage) are positioned on the surfaces of the hexahedron at positions indicated by the position data representing the virtual objects having been rotated by (90-B) degrees with respect to the plane positions.

As described above, the photographed image is mapped on the inner surfaces of the polygon representing the surfaces of the hexahedron having been rotated by the rotation angle B, and the object images are mapped on polygons representing the virtual objects (the building, the cone, and the smaller targets of the second stage) (step S900). At this time, a predetermined image is mapped on the outer surfaces of the polygon representing the surfaces of the hexahedron, and the photographed images in the region opposing the outer surfaces of the polygon are changed to a predetermined image as described above.

Figure 14F:
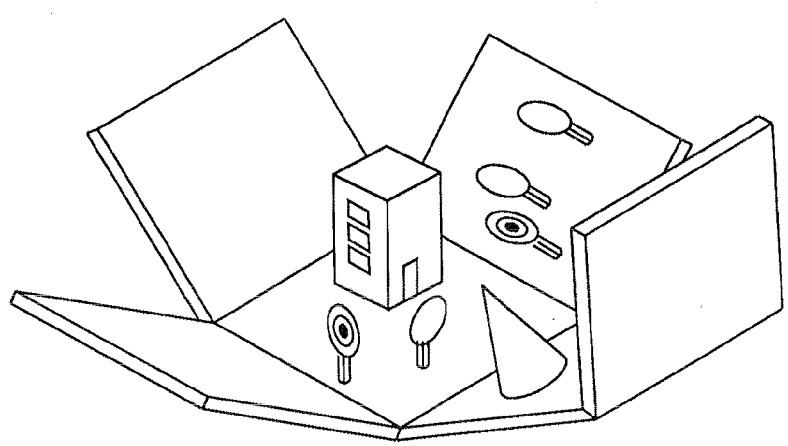
FIG. 14F is a diagram illustrating a state in which the hexahedron in the state shown in FIG. 14E is being unfolded.

Thus, the hexahedron is unfolded, and a state (a state for the rotation angle B indicating 0 degrees) shown in FIG. 14E shifts to a state (a state for the rotation angle B indicating about 45 degrees) shown in FIG. 14F. In FIG. 14F, unlike in FIG. 14D, a state in which the photographed image is texture-mapped, a state in which a predetermined image is texture-mapped on the outer surfaces of the hexahedron, and a state in which the photographed images in the region opposing the outer surfaces are changed to the same predetermine image, are not shown. However, FIG. 14F shows the same states as shown in FIG. 14D except that the virtual objects are changed (to the building, the cone, and the smaller targets of the second stage).

Figure 14G:
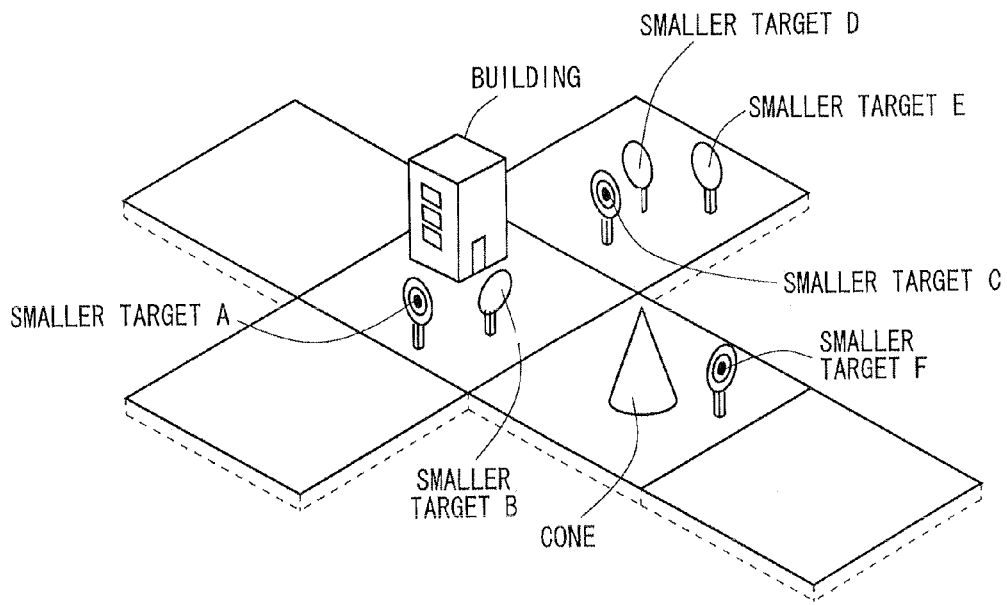
FIG. 14G is a diagram illustrating a state in which the hexahedron in the state shown in FIG. 14F has been completely unfolded.

Thus, the process for unfolding the hexahedron is performed until the second time period elapses from the start of the unfolding, and the hexahedron is completely unfolded, as shown in FIG. 14G, when the second time period has elapsed. As shown in FIG. 14G, when the hexahedron is completely unfolded, the building, the cone, and the smaller targets A to F of the second stage are displayed.

When the hexahedron is completely unfolded, the layed-flat surfaces of the hexahedron which correspond to the surfaces having been rotated by the rotation angle B indicating 90 degrees are displayed. At this time, a color of the layed-flat surfaces of the hexahedron or a color of the sides of the layed-flat surfaces of the hexahedron may be gradually changed from a state indicated by the solid line in FIG. 14G to a state indicated by dotted lines in FIG. 14H such that the layed-flat surfaces of the hexahedron gradually disappear so as to sink.

As described for FIG. 14C to FIG. 14E, FIG. 14E to FIG. 14H do not show a state in which the hexahedron is continuously changed. However, the main flow shown in the flow chart of FIG. 10 is repeated in a cycle of about 1/30 seconds in practice. Therefore, the following animation is displayed. When the folded hexahedron is unfolded, the virtual objects (the building, the cone, and the smaller targets of the second stage) on the surfaces of the hexahedron are rotated in accordance with the surfaces being rotated, and gradually become visible. When the hexahedron is completely unfolded, the virtual objects (the building, the cone, and the smaller targets of the second stage) appear.

Figure 14H:
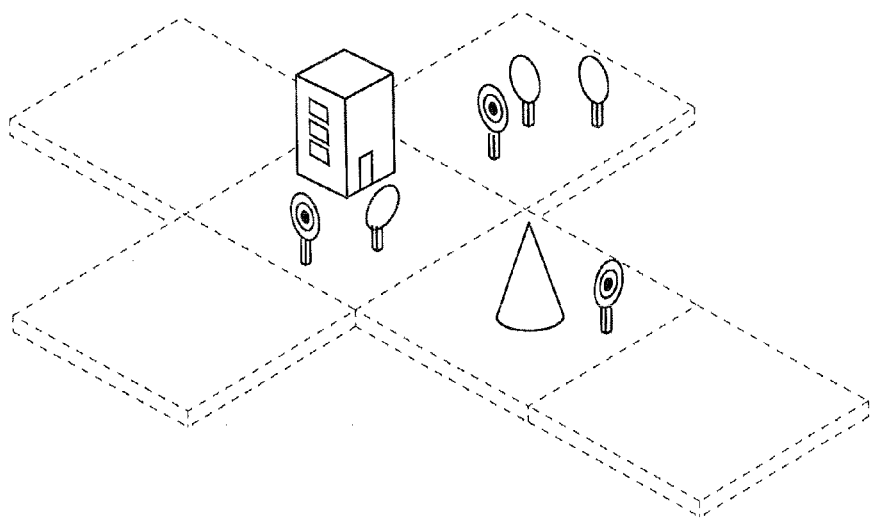
FIG. 14H is a diagram illustrating a state in which the layed-flat surfaces of the unfolded hexahedron disappear in the state shown in FIG. 14G.
Figure 15:
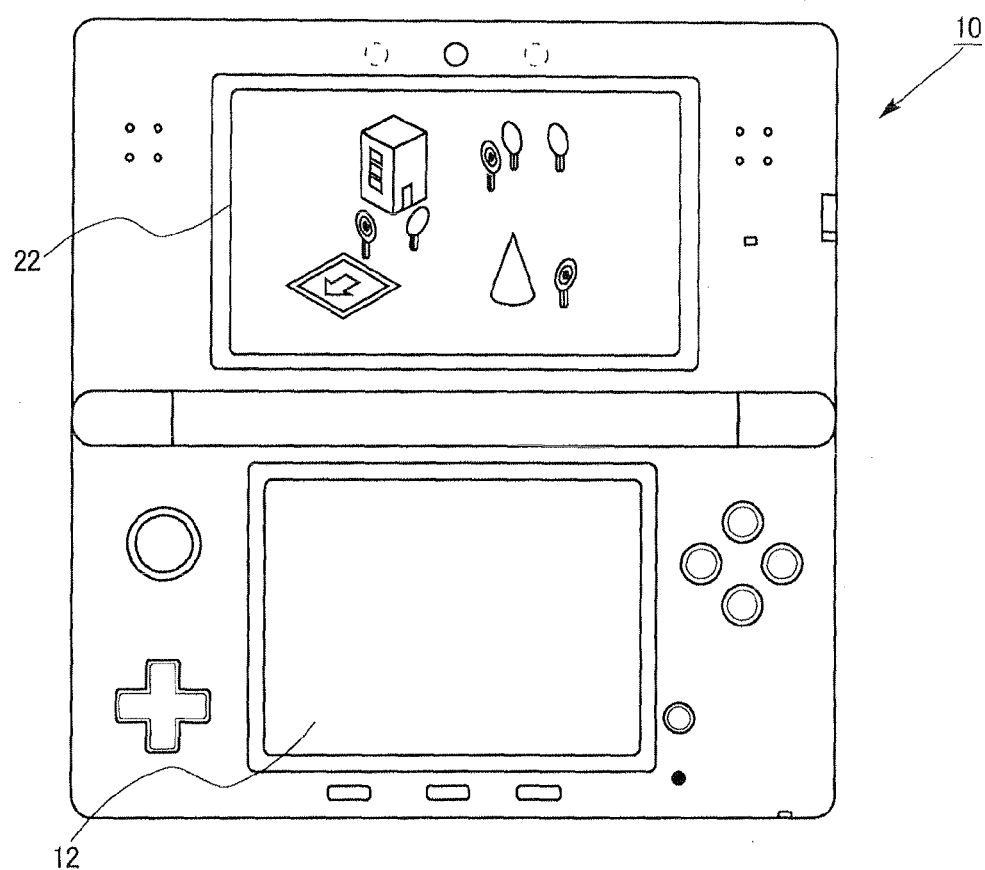
FIG. 15 is a diagram illustrating a state which is displayed on the upper LCD 22 when a second stage of the shooting game starts.

As shown in FIG. 14H, the number of the targets of the second stage is greater than the number of the targets of the first stage, and the size of each target of the second stage is smaller than the size of each target of the first stage, and the targets of the second stage do not face in the same direction although the targets of the first stage face in the same direction. Therefore, the difficulty level is enhanced. Thus, the screen of the first stage shown in FIG. 13 is switched to the screen of the second stage shown in FIG. 15.

Figure 16:
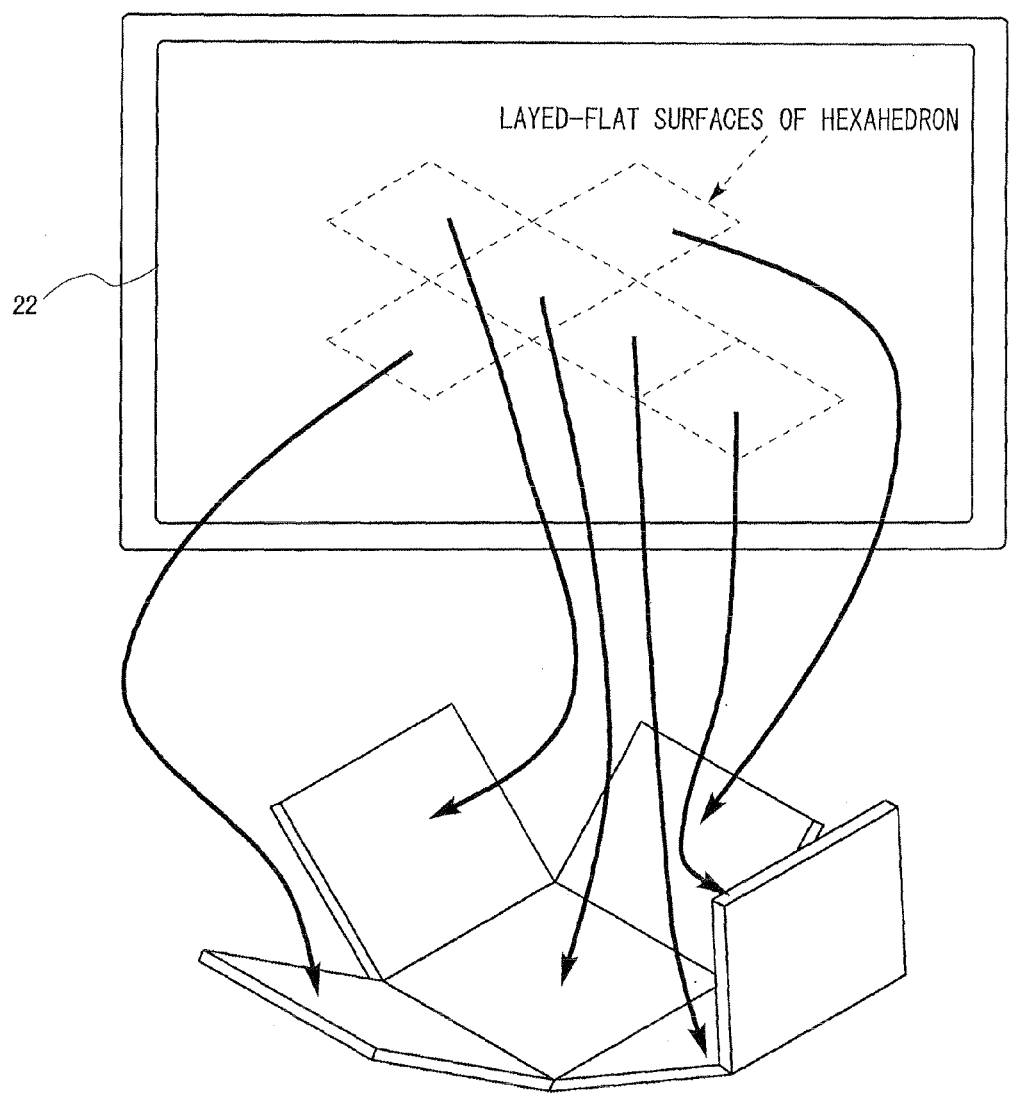
FIG. 16 is a diagram illustrating a case where a photographed image is texture-mapped on the surfaces of the hexahedron.

In states shown in FIG. 14D and FIG. 14F, the photographed image of the region corresponding to the surfaces of the hexahedron are texture-mapped on the inner surfaces of the hexahedron. This will be described with reference to FIG. 16. As shown in FIG. 16, images of six regions corresponding to the layed-flat surfaces of the hexahedron which are positioned in a real world (real space) photographed by the outer imaging section 23 are texture-mapped on the six inner surfaces, respectively, of the hexahedron. Thus, the photographed image cut from the regions in which the layed-flat surfaces of the hexahedron are positioned is displayed on the surfaces of the hexahedron also while the hexahedron is being folded or is being unfolded, thereby realizing a natural augmented reality effect.

As described above, the game apparatus 10 of the present embodiment enables realization of the shooting game in which the virtual objects such as targets of the game are superimposed on a real world (real space) photographed by the outer imaging section 23, so as to enable a natural augmented reality effect to be provided to a user. In this case, when the stages are switched, the virtual objects (particularly, targets) need to be changed. At this time, the hexahedron having the layed-flat surfaces which have appeared so as to project is folded, and the targets of the first stage are confined therein and disappear. When the hexahedron is unfolded, the targets of the second stage appear, and the layed-flat surfaces of the hexahedron disappear so as to sink. Since the stages are switched (the virtual objects are changed) in the manner described above, the virtual objects can be switched such that the realized natural augmented reality effect is not spoiled, and a user becomes interested in an image displayed when the virtual objects are switched.

(Modification)

In the embodiment described above, the layed-flat surfaces of the hexahedron appear on a position different from the position of the marker. However, the positions of the layed-flat surfaces of the hexahedron may be determined such that the bottom surface of the hexahedron appear so as to project from the position of the marker. In this case, the size of the bottom surface of the hexahedron is preferably equal to the size of the marker.

Further, the sizes of the layed-flat surfaces of the hexahedron may be changed in accordance with states, in the stage, such as the positions at which the virtual objects are positioned, and the number of the positioned virtual objects, and the sizes of the virtual objects. Further, a large virtual object (for example, a tall tree) may be changed such that the large virtual object is gradually reduced in size in the height direction, in accordance with a state in which the hexahedron is being folded, so as to be confined in the hexahedron, when the hexahedron is folded.

Further, the polyhedron is not limited to a hexahedron, and may be any solid shape which has surfaces the number of which is greater than or equal to the number of surfaces of a tetrahedron, and which can form a closed space. Moreover, the polyhedron may be any solid shape which can form a closed space, and which can be unfolded to open the closed space. For example, the closed space may be formed by using a stretchable cloth.

Furthermore, the present invention is applicable to any mobile electronic devices (such as PDAs (Personal Digital Assistants) and mobile telephones), personal computers, cameras, and the like as well as to the game apparatus according to the present embodiment.

Further, the virtual object display process based on the flow chart described above is performed by a predetermined program being executed by the information processing section 31 of the game apparatus 10 of the present embodiment. However, the present invention is not limited thereto. A part or the entirety of the virtual object display process may be performed by a dedicated circuit included in the game apparatus 10.

Moreover, the process described above not only may be performed by one game apparatus (information processing apparatus), but also may be shared and performed by a plurality of information processing apparatuses connected to each other so as to communicate with each other.

In the present embodiment, a video see-through method in which the virtual objects (such as the targets of the shooting game) are superimposed on a camera image photographed by the outer imaging section 23 to display the superimposed image on the upper LCD 22 is described. However, the present invention is not limited thereto. For example, an optical see-through method may be realized. In this case, a head-mounted display including at least a camera is used, and a user can view a real space through a display section corresponding to lenses of glasses. The display section is formed of a material which enables the transmission of the real space, and enables the real space to be transmitted directly to eyes of a user. Further, an image representing virtual objects generated by a computer can be displayed on the display section. Thus, a user can view an image in which images of the virtual objects are superimposed on the real space. The camera included in the head-mounted display is used to detect for the marker disposed in the real space.

Further, in the present embodiment, when a game of a certain stage successfully resolves, the layed-flat surfaces of the hexahedron appear on positions at which the virtual objects including the targets to be shot are positioned. However, the present invention is not limited thereto. For example, when the game is started, only the layed-flat surfaces of the hexahedron appear, and then the stage may appear. In this case, the hexahedron is folded to form a closed space. Next, the virtual objects of the first stage are positioned on the inner surfaces of the hexahedron, and then hexahedron is unfolded and the virtual objects of the first stage are displayed. The layed-flat surfaces of the hexahedron disappear, and the first stage is started. Further, in the first stage, in a case where, at a time when an arrow having been shot hits a target, an image representing the target having been hit disappears, when the first stage is cleared, all the targets of the first stage disappear. In this case, when the first stage is switched to the second stage, only the layed-flat surfaces of the hexahedron appear, the hexahedron are folded, and the hexahedron is then unfolded, and thereafter the second stage appear, in a manner similar to that for starting the game.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program executed by a computer of an information processing apparatus which is connected to an imaging device, a display device for displaying a real space so as to be visible on a screen, and a storage device for storing object data representing a first virtual object in which a closed space is formed, and object data representing a second virtual object positioned in the closed space, the computer being caused to at least:
    sequentially acquire photographed image data representing a photographed image taken by the imaging device;
    change a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or change the shape of the first virtual object from the opened shape to the closed shape;
    position at least one second virtual object on the inner surfaces of the first virtual object, and change a position and an orientation of the second virtual object in cooperation with the inner surfaces of the first virtual object in accordance with the first virtual object changing from the closed shape to the opened shape;
    as a texture, an image of a region corresponding to the first virtual object of the opened shape, on the inner surfaces of the first virtual object, wherein the image of the region corresponding to the first virtual object of the opened shape is a corresponding part of the photographed image represented by the photographed image data which is acquired sequentially;
    generate an object image based on each of the second virtual object, and the first virtual object on which the texture is mapped; and
    display, by means of the display device, a superimposed image in which the generated object image is superimposed on the real space on the screen.

2. The non-transitory computer-readable storage medium having stored therein the information processing program according to claim 1, wherein
    the shape of the first virtual object is changed in a form of an animation in which a closed state and an opened state of the first virtual object are sequentially switched therebetween, and
    the position and the orientation of the second virtual object is changed in accordance with progress of the animation.

3. The non-transitory computer-readable storage medium having stored therein the information processing program according to claim 2, wherein
    the shape of the first virtual object is changed from the opened shape to the closed shape, and
    the shape of the first virtual object is changed from the closed shape to the opened shape after the second virtual object is positioned.

4. The non-transitory computer-readable storage medium having stored therein the information processing program according to claim 2, wherein,
    at least one third virtual object is positioned on the inner surfaces of the first virtual object when the first virtual object has the opened shape, and
    a position and an orientation of the at least one third virtual object is changed in cooperation with the inner surfaces of the first virtual object in accordance with the first virtual object changing from the opened shape to the closed shape.

5. The non-transitory computer-readable storage medium having stored therein the information processing program according to claim 4, wherein the second virtual object, instead of the at least one third virtual object, is positioned on the inner surfaces of the first virtual object after the first virtual object is changed from the opened shape to the closed shape.

6. The non-transitory computer-readable storage medium having stored therein the information processing program according to claim 1, wherein a display is made so as to prevent the second virtual object from being transmitted through surfaces forming the closed space.

7. The non-transitory computer-readable storage medium having stored therein the information processing program according to claim 2, wherein
    the first virtual object is a polyhedron formed of a plurality of surfaces which can be layed flat, and
    the animation includes a shift from a first state to a second state, and the first state represents a state in which the polyhedron is unfolded and the plurality of surfaces of the polyhedron are positioned so as to be layed flat, and the second state represents a state in which the plurality of surfaces of the polyhedron are rotated, and form the closed space of the polyhedron.

8. The non-transitory computer-readable storage medium having stored therein the information processing program according to claim 7, wherein the animation includes a shift from appearance of the plurality of surfaces, of the polyhedron, which are layed flat, to the first state.

9. The non-transitory computer-readable storage medium having stored therein the information processing program according to claim 8, wherein the animation includes a shift from change of a color of the plurality of surfaces of the polyhedron or change of a color of a border line of the plurality of surfaces of the polyhedron, to appearance of the plurality of surfaces of the polyhedron.

10. The non-transitory computer-readable storage medium having stored therein the information processing program according to claim 2, wherein
    the first virtual object is a polyhedron formed of a plurality of surfaces which can be layed flat, and
    the animation includes a shift from a first state to a third state through a second state, and the first state represents a state in which the polyhedron is unfolded and the plurality of surfaces of the polyhedron are positioned so as to be layed flat, and the second state represents a state in which the plurality of surfaces of the polyhedron are rotated, and form the closed space of the polyhedron, and the third state represents a state in which the plurality of surfaces of the polyhedron are reversely rotated, the polyhedron is unfolded, and the second virtual object is positioned on the plurality of surfaces of the polyhedron which are layed flat.

11. The non-transitory computer-readable storage medium having stored therein the information processing program according to claim 10, wherein the animation includes a shift from appearance of the plurality of surfaces, of the polyhedron, which are layed flat, to the first state, or a shift from the third state to disappearance of the plurality of surfaces, of the polyhedron, which are layed flat.

12. The non-transitory computer-readable storage medium having stored therein the information processing program according to claim 11, wherein the animation includes a shift from change of a color of the plurality of surfaces of the polyhedron or change of a color of a border line of the plurality of surfaces of the polyhedron, to appearance of the plurality of surfaces, of the polyhedron, which are layed flat, or a shift from the third state, through change of the color of the plurality of surfaces of the polyhedron or change of the color of the border line of the plurality of surfaces of the polyhedron, to disappearance of the plurality of surfaces, of the polyhedron, which are layed flat.

13. The non-transitory computer-readable storage medium having stored therein the information processing program according to claim 7, wherein the second virtual object is rotated in cooperation with rotation of the plurality of surfaces of the polyhedron, to change the position and the orientation of the second virtual object.

14. The non-transitory computer-readable storage medium having stored therein the information processing program according to claim 7, wherein the program causes the computer to further map a predetermined image, as a texture, on the outer surfaces of the polyhedron which are reverse of the plurality of surfaces.

15. The non-transitory computer-readable storage medium having stored therein the information processing program according to claim 14, wherein the program causes the computer to further change display of the photographed image corresponding to a region which is mapped as the texture on the outer surfaces of the polyhedron.

16. The non-transitory computer-readable storage medium having stored therein the information processing program according to claim 7, wherein the polyhedron is a hexahedron.

17. The non-transitory computer-readable storage medium having stored therein the information processing program according to claim 1, wherein the program causes the computer to further operate the second virtual object in accordance with an operation performed by a user.

18. The non-transitory computer-readable storage medium having stored therein the information processing program according to claim 1, wherein
the program causes the computer to further:
detect a predetermined object, from the photographed image data which is acquired sequentially;
calculate a relative positional relationship between the imaging device and the predetermined object, based on a result of the detection of the predetermined object; and
sequentially set the virtual camera in a virtual space based on a result of calculation, and
generate the object image by taking images of the first virtual object and the second virtual object by means of the virtual camera.

19. An information processing apparatus comprising:
an imaging device;
a display device configured to display a real space so as to be visible on a screen;
a computer-readable storage memory configured to store object data representing a first virtual object in which a closed space is formed, and object data representing a second virtual object positioned in the closed space;
a computer processing system comprising at least one computer processor, the computer processing system configured to:
sequentially acquire photographed image data representing a photographed image taken by the imaging device;
change a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or change the shape of the first virtual object from the opened shape to the closed shape;
position at least one second virtual object on the inner surfaces of the first virtual object, and change a position and an orientation of the second virtual object in cooperation with the inner surfaces of the first virtual object in accordance with the first virtual object changing from the closed shape to the opened shape;
map, as a texture, an image of a region corresponding to the first virtual object of the opened shape, on the inner surfaces of the first virtual object, wherein the image of the region corresponding to the first virtual object of the opened shape is a corresponding part of the photographed image represented by the photographed image data which is sequentially acquired;
generate an object image based on each of the second virtual object, and the first virtual object on which the texture is mapped; and
display, using the display device, a superimposed image in which the generated object image is superimposed on the real space on the screen.

20. An information processing system comprising:
an imaging unit;
a display unit configured to display a real space so as to be visible on a screen;
a storage unit configured to store object data representing a first virtual object in which a closed space is formed, and object data representing a second virtual object positioned in the closed space;
a photographed image data acquisition unit configured to sequentially acquire photographed image data representing a photographed image taken by the imaging unit;
a first object control unit configured to change a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape;
a second object control unit configured to position at least one second virtual object on the inner surfaces of the first virtual object, and change a position and an orientation of the second virtual object in cooperation with the inner surfaces of the first virtual object in accordance with the first virtual object changing from the closed shape to the opened shape;
a texture mapping unit configured to map, as a texture, an image of a region corresponding to the first virtual object of the opened shape, on the inner surfaces of the first virtual object, wherein the image of the region corresponding to the first virtual object of the opened shape is a corresponding part of the photographed image represented by the photographed image data which is sequentially acquired by the photographed image data acquisition unit;

an object image generation unit configured to generate an object image based on each of the second virtual object, and the first virtual object on which the texture is mapped; and a display control unit configured to display, by the display unit, a superimposed image in which the object image generated by the object image generation unit is superimposed on the real space on the screen.

21. An information processing method comprising:

taking a photographed image by means of an imaging device;

displaying an image by means of a display device;

storing object data representing a first virtual object in which a closed space is formed, and object data representing a second virtual object positioned in the closed space;

sequentially acquiring photographed image data representing a photographed image taken by the imaging device;

changing a shape of the first virtual object having inner surfaces and outer surfaces, from a closed shape having the closed space formed by the inner surfaces of the first virtual object facing inward, to an opened shape formed when the first virtual object is unfolded so as to enable the inner surfaces to be captured by a virtual camera, or for changing the shape of the first virtual object from the opened shape to the closed shape;

positioning at least one second virtual object on the inner surfaces of the first virtual object, and changing a position and an orientation of the second virtual object in cooperation with the inner surfaces of the first virtual object in accordance with the first virtual object changing from the closed shape to the opened shape;

mapping, as a texture, an image of a region corresponding to the first virtual object of the opened shape, on the inner surfaces of the first virtual object, wherein the image of the region corresponding to the first virtual object of the opened shape is a corresponding part of the photographed image represented by the photographed image data which is acquired sequentially;

generating an object image based on each of the second virtual object, and the first virtual object on which the texture is mapped; and displaying a superimposed image in which the generated object image is superimposed on the real space on the screen.

* * * * *